(12) United States Patent
Takizawa

(10) Patent No.: US 12,388,520 B2
(45) Date of Patent: Aug. 12, 2025

(54) RELAY STATION, TRANSMISSION METHOD FOR RELAY STATION, AND COMMUNICATION SYSTEM

(71) Applicant: TOYOTA JIDOSHA KABUSHIKI KAISHA, Toyota (JP)

(72) Inventor: Kenichi Takizawa, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 18/446,976

(22) Filed: Aug. 9, 2023

(65) Prior Publication Data

US 2024/0056165 A1 Feb. 15, 2024

(30) Foreign Application Priority Data

Aug. 10, 2022 (JP) ................................ 2022-128097
Sep. 28, 2022 (JP) ................................ 2022-155253

(51) Int. Cl.
*H04B 7/155* (2006.01)
*H04W 56/00* (2009.01)

(52) U.S. Cl.
CPC .... *H04B 7/15528* (2013.01); *H04W 56/0045* (2013.01)

(58) Field of Classification Search
CPC .............. H04B 7/15528; H04B 7/0671; H04B 7/0676; H04B 7/15585; H04W 56/0045
See application file for complete search history.

(56) References Cited

U.S. PATENT DOCUMENTS

| 10,009,825 B1* | 6/2018 | Marupaduga ...... H04B 7/15528 |
| 2021/0143894 A1* | 5/2021 | Bai ................... H04L 25/03159 |
| 2024/0267825 A1* | 8/2024 | Zhang ..................... H04B 7/14 |

FOREIGN PATENT DOCUMENTS

WO WO 2006/121381 A1 11/2006

OTHER PUBLICATIONS

H. Chen, et al., "Filter-and-Forward Distributed Beamforming in Relay Networks with Frequency Selective Fading", IEEE Trans. On Signal Processing, vol. 58, No. 3, Mar. 2010.
M. Noguchi, et al., "A Single Frequency Full-Duplex Radio Relay Station for Frequency Domain Equalization Systems", Technical Report of The Institute of Electronics, Information and Communication Engineers, vol. SIP 2011-109, Jan. 2012.

* cited by examiner

*Primary Examiner* — Ashley Shivers
(74) *Attorney, Agent, or Firm* — Finnegan, Henderson, Farabow, Garrett and Dunner, LLP

(57) ABSTRACT

A relay station comprises antennas, wireless devices corresponding to the antennas, and a controller to control an operation of the wireless devices. Each of the wireless devices includes a receiver to convert the first radio signal received by a corresponding antenna into a baseband signal, an FIR filter to assign a delay to the baseband signal; and a transmitter to convert a signal output from the FIR filter into a second radio signal transmitted from the corresponding antenna to the reception station. The controller sets a different delay amount in the FIR filter in each of the wireless devices so that the FIR filter assigns a delay, which is different from among the antennas, to the baseband signal input from the receiver in each of the wireless devices.

20 Claims, 15 Drawing Sheets

Example: When $\Delta_0 = 0, \Delta_1 = \Delta_{max}$ at 2 antennas in RELAY STATION

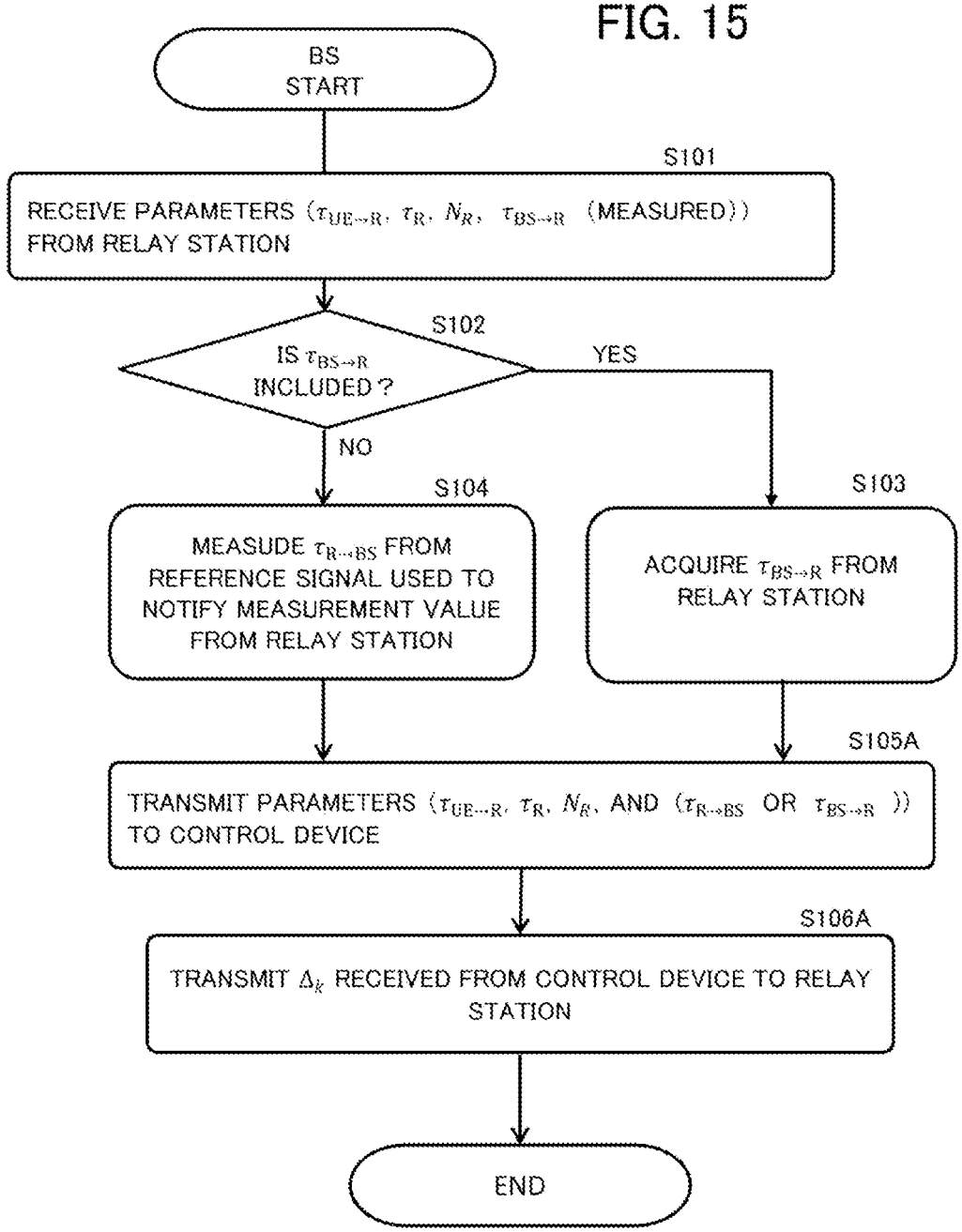

RELAY STATION, TRANSMISSION METHOD FOR RELAY STATION, AND COMMUNICATION SYSTEM

CROSS REFERENCE TO THE RELATED APPLICATION

This application claims the benefits of Japanese Patent Application No. 2022-128097, filed on Aug. 10, 2022 and Japanese Patent Application No. 2022-155253, filed on Sep. 28, 2022, which are hereby incorporated by reference herein in its entirety.

BACKGROUND

1. Technical Field

The present disclosure relates to a relay station, a transmission method for the relay station, and a communication system.

2. Description of the Related Art

In wireless communications such as the 5th Generation Mobile Communication System (5G), communications with an ultra-low delay of sub-milliseconds or less are expected. On the other hand, from the viewpoint of improvement of communication services, it is desired to expand a coverage area of cells, and to this end, relay communication via relay stations is effective. Therefore, a wireless communication method, in which a terminal station that performs wireless communication is used as a relay station, has been proposed. Furthermore, non-regenerative relay, in which demodulation and decoding are not performed at a relay station, is desirable as a relay technology with less delay. For further information, see H. Chen. A. B. Gershman, and S. Shahbazpanahi, "Filter-and-Forward Distributed Beamforming in Relay Networks with Frequency Selective Fading", IEEE Trans. On Signal Processing, vol. 58, no. 3, March 2010, and Noguchi, Hayashi, Kaneko, Sakai, "A Single Frequency Full-Duplex Radio Relay Station for Frequency Domain Equalization Systems," IEICE Technical Report, vol. SIP2011-109, January, 2012.

SUMMARY

An object of the present disclosure is to provide a relay station, a transmission method therefor, and a communication system that allow a reception station to obtain a preferable diversity effect.

Aspects of the present disclosure may include a relay station capable of executing non-regenerative relay of a first radio signal transmitted from a transmission station to a reception station having one antenna, the relay station comprising: a plurality of antennas; a plurality of wireless devices corresponding to the plurality of antennas, respectively; and a controller configured to control an operation of the plurality of wireless devices, wherein each of the plurality of wireless devices includes a receiver configured to convert the first radio signal received by a corresponding antenna into a baseband signal; a finite impulse response (FIR) filter configured to assign a delay to the baseband signal; and a transmitter configured to convert a signal output from the FIR filter into a second radio signal transmitted from the corresponding antenna to the reception station, and wherein the controller sets a different delay amount in the FIR filter in each of the plurality of wireless devices so that the FIR filter assigns a delay, which is different from among the plurality of antennas, to the baseband signal input from the receiver in each of the plurality of wireless devices.

The aspects of the present disclosure may include a transmission method for a relay station including a plurality of antennas, the method comprising executing by the relay station: receiving, by each of the plurality of antennas, a first radio signal transmitted from a transmission station to a reception station having one antenna; converting the first radio signal received by each of the plurality of antennas into a baseband signal corresponding to each of the plurality of antennas; assigning a delay, which is different from among the plurality of antennas, to each of the baseband signals corresponding to the plurality of antennas by using a plurality of FIR filters; and converting each of signals output from the plurality of FIR filters into a second radio signal for the reception station and transmitting the second radio signal from the corresponding antenna.

The aspects of the present disclosure may include a communication system comprising: a transmission station; a reception station with one antenna; and at least one relay station capable of executing non-regenerative relay for a first radio signal transmitted from the transmission station to the reception station, wherein the relay station includes a plurality of antennas, a plurality of wireless devices corresponding to the plurality of antennas, respectively; and a controller configured to control an operation of the plurality of wireless devices, each of the plurality of wireless devices includes a receiver configured to convert the first radio signal received by the corresponding antenna into a baseband signal, an FIR filter configured to assign a delay to the baseband signal, and a transmitter configured to convert a signal output from the FIR filter into a second radio signal transmitted from the corresponding antenna to the reception station, and the controller sets a different delay amount in the FIR filter in each of the plurality of wireless devices so that the FIR filter assigns a delay, which is different from among the plurality of antennas, to the baseband signal input from the receiver in each of the plurality of wireless devices.

According to the disclosure, the receiving station is able to obtain a suitable diversity effect.

BRIEF DESCRIPTION OF THE DRAWINGS

FIG. 15 is a flowchart illustrating an example of processing of a base station in Modification example 2.

DESCRIPTION OF THE PREFERRED EMBODIMENTS

Figure 1:
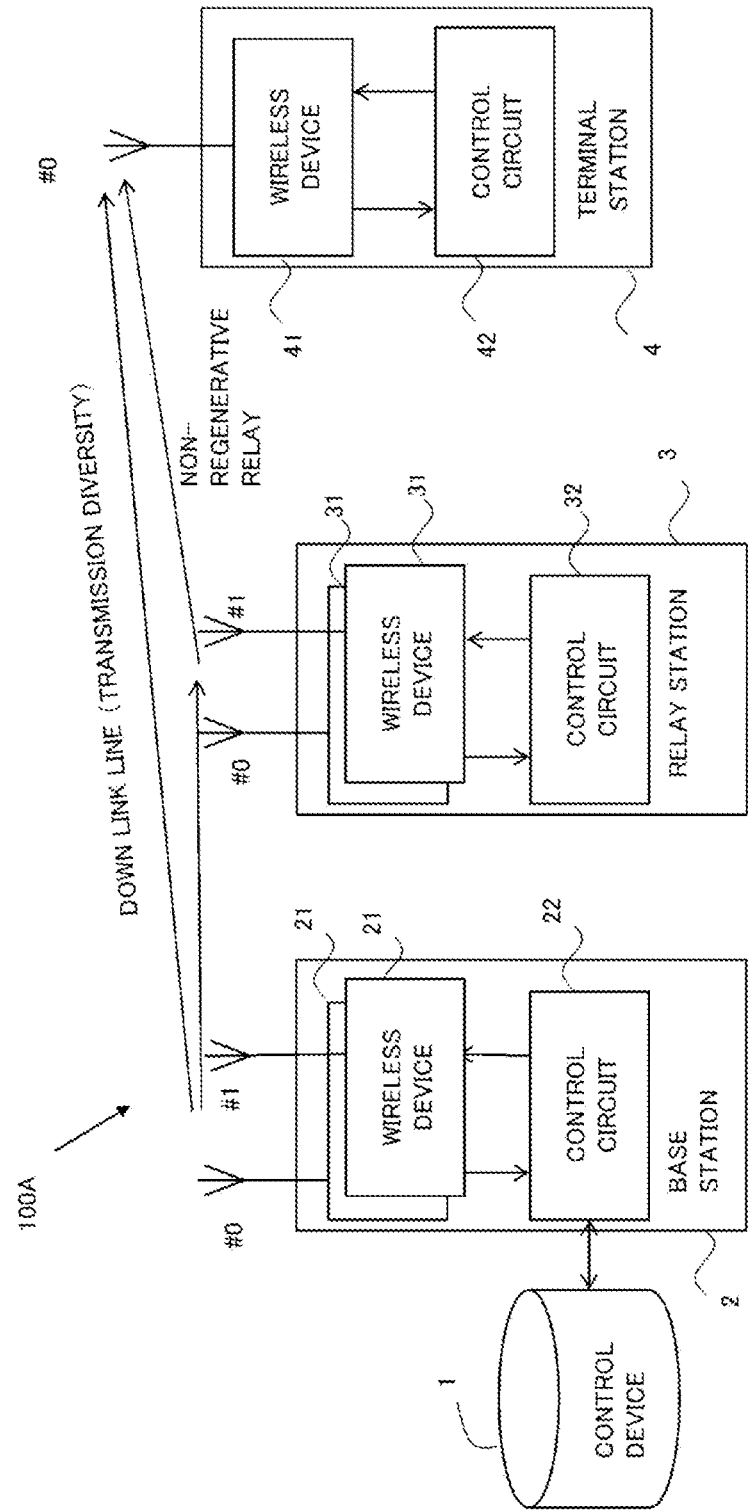
FIG. 1 is a diagram illustrating a first configuration example of a communication system according to an embodiment.

In the Third Generation Partnership Project (3GPP (registered trademark)), a base station (BS) provides "the transmission diversity (Tx diversity)". The transmission diversity is a function in which the base station uses a plurality of transmission antennas to transmit a signal (called a downlink signal) from the base station to a terminal station. According to the transmission diversity, even when the terminal station has only one antenna, the terminal station can obtain a diversity effect (diversity gain) and improve a signal-to-interference ratio (SIR).

In a 5G communication system, it is conceivable that a relay station transmit a radio signal from a base station to which the transmission diversity has been applied to a terminal station through non-regenerative relay. In such a case, when a correlation between radio signal propagation characteristics among a plurality of antennas included in the relay station and radio signal propagation characteristics between the base station and the relay station is high, there is concern that it will not be possible to obtain a sufficient diversity effect at the terminal station.

In the present disclosure, the relay station includes a plurality of antennas and FIR filters, and assigns a different delay amount to each antenna in the non-regenerative relay, thereby realizing delay diversity for radio signals transmitted from the plurality of antennas. This makes it possible to improve the diversity gain in the terminal station. However, a configuration of the relay station, which will be described below, can be applied to a radio signal from a base station (transmission station) to which the transmission diversity is not applied (for example, when the base station transmits a radio signal to a terminal station having one antenna using one antenna). In the present disclosure, the "reception station having one antenna" includes not only a terminal station having one antenna but also a terminal station having two or more antennas but using only one antenna for reception of a radio signal from the transmission station and the relay station.

A communication system according to the present disclosure can include a transmission station, a reception station, at least one (one or more) relay stations, and a control device. The transmission station is, for example, a base station, and the reception station is, for example, a terminal station. However, the transmission station may be the terminal station and the reception station may be the base station. The relay stations are, for example, small base stations, mobile base stations, smartphones, or in-vehicle devices. Slot timings of radio frames are synchronized between the transmission station, the reception station, and the one or more relay stations.

The relay station performs the non-regenerative relay of a radio signal. In the non-regenerative relay, a radio signal (a first radio signal) received from a transmission station is converted into a baseband signal, but the baseband signal is not demodulated or decoded. The baseband signal is manipulated, and the manipulated baseband signal is converted to a radio signal and transmitted from an antenna. The relay station according to the present disclosure includes a plurality of antennas and a wireless device for each antenna, and the non-regenerative relay of the radio signal as described above is executed for each antenna and wireless device. In the present disclosure, each finite impulse response (FIR) filter included in each wireless device assigns delays different among antennas to respective baseband signals as an operation with respect to the baseband signals corresponding to the plurality of antennas. It is possible to apply delay diversity to a radio signal (a second radio signal) transmitted from a plurality of antennas to the reception station by assigning a delay.

The relay station includes a controller (control unit), and the controller calculates a delay amount to be set in the FIR filter included in each wireless device of the relay station. For example, the controller can use a first propagation delay which is a propagation delay of a signal received from the reception station by the relay station, a second propagation delay which is a propagation delay of a signal received from the transmission station by the relay station, and a signal processing delay in the relay station to obtain a maximum delay, and calculate the delay amount to be set in each FIR filter within a range in which the maximum delay is not exceeded. This makes it possible for each FIR filter to assign a desired delay different among the antennas to the baseband signal.

The controller is, for example, a computer, a processor such as a central processing unit (CPU), an arithmetic circuit (integrated circuit) such as a field programmable gate array (FPGA), or a combination thereof. The control device included in the communication system can be configured of the computer, the processor such as the CPU, the integrated circuit, or a combination thereof that has been described above. The control device can give an instruction to the relay station, and the relay station can receive the instruction from the control device and perform assignment of the delay described above. It is also conceivable that the control device calculate the delay amount to be set in each of the FIR filters described above and include the delay amount in the instruction, and the controller set the delay amount included in the instruction in each FIR filter.

The FIR filter according to the present disclosure may perform filtering for curbing interference between a radio signal received from the transmission station and a radio signal transmitted to the reception station, which occurs in the relay station. The interference between the signal received from the transmission station and the signal to be transmitted to the reception station is also called self-interference (SI). The controller can set a weight for curbing the self-interference for the FIR filter.

Further, aspects of the present disclosure can also be specified as a program for causing the relay station to execute the transmission method for a relay station, and a computer-readable non-transitory storage medium having the program recorded thereon, in addition to the relay station, the transmission method for a relay station, and the communication system including the relay station described above.

Hereinafter, embodiments of the present disclosure will be described on the basis of the drawings. Configurations of the following embodiments are examples, and the present disclosure is not limited to the configurations of the embodiments. In the embodiment, a 5G communication system is illustrated as a communication system, but configurations of the transmission station, the relay station, and the reception station according to the present disclosure can be applied to communication systems (a wireless LAN, or the like) other than 5G.

FIG. 1 is a diagram illustrating a first configuration example of a communication system. In FIG. 1, a communication system 100A according to the first configuration example includes a control device 1, a base station 2, a relay station 3, and a terminal station 4. Although one relay station 3 is shown as an example of at least one relay station in FIG. 1, the communication system 100A includes two or more relay stations 3 (3-1, . . . , 3-N (N is an integer indicating the number of relay stations)) between the base station 2 and the terminal station 4. Further, in the communication system 100A, the number of terminal stations 4 may be singular or plural (one terminal station 4 is illustrated in FIG. 1).

The control device 1 is an apparatus on a network (for example, a core network) to which the base station 2 is connected. However, it is also conceivable that the control device 1 is the core network itself or a system included in the core network. The core network includes, for example, an optical fiber network. The control device 1 controls the base station 2, the relay station 3, and the terminal station 4, and provides the terminal station 4 with a communication service.

The base station 2 provides the terminal station 4 with a wireless access network. An area in which radio communication is possible in the wireless access network is also called a cell. The base station 2 includes one or more antennas (for example, antennas #0 and #1), a wireless device (radio) 21 corresponding to each antenna, and a control circuit 22 in the embodiment. The control circuit 22 includes, for example, a processor and a memory. The processor controls communication with the control device 1 (the base station 2) and wireless communication with the relay station 3 and the terminal station 4 according to a computer program in the memory.

The relay station 3 relays wireless communication between the base station 2 and the terminal station 4. The relay station 3 is, for example, a small base station, a mobile base station, an in-vehicle apparatus, or a smart phone. The relay station 3 can be selected as a relay station by the control device 1 from among apparatuses having a configuration capable of the non-regenerative relay. When a connection request is generated from the terminal station 4, the control device 1 can select one or more relay stations 3 located within a range of the cell provided by the base station 2, and transmit an instruction to perform the non-regenerative relay of wireless communication to each relay station 3. The relay station 3 that has received the instruction operates as the relay station 3 selected by the control device 1.

The relay station 3 includes one or more antennas (for example, #0), a wireless device 31 corresponding to each antenna, and a control circuit 32 (an example of a "controller (control unit)"), like the base station 2.

The terminal station 4 is, for example, a mobile station such as a smart phone, a tablet terminal, a wearable terminal, or an in-vehicle data communication apparatus. However, the terminal station 4 is not limited thereto, and may be a stationary terminal apparatus. For example, the terminal apparatus connects to the wireless access network within the range of the cell provided by the base station 2.

The terminal station 4 includes one antenna (for example, #0) that is used for reception of a radio signal, a wireless device 41 connected to the antenna, and a control circuit 42. For example, the mobile station in the cell requests the base station 2 to connect the mobile station to the wireless access network, and is connected to the wireless access network, so that the mobile station operates as the terminal station 4. A mobile station within the cell may directly request the base station 2 to connect the mobile station to the wireless access network. Alternatively, the mobile station within the cell may request the base station 2 to connect the mobile station to the wireless access network via an apparatus operating as a relay station 3 within the cell. The terminal station 4 can be said to be a station capable of communicating with the base station 2 via any of one or more relay stations 3 or not via any of the one or more relay stations 3.

Figure 2:
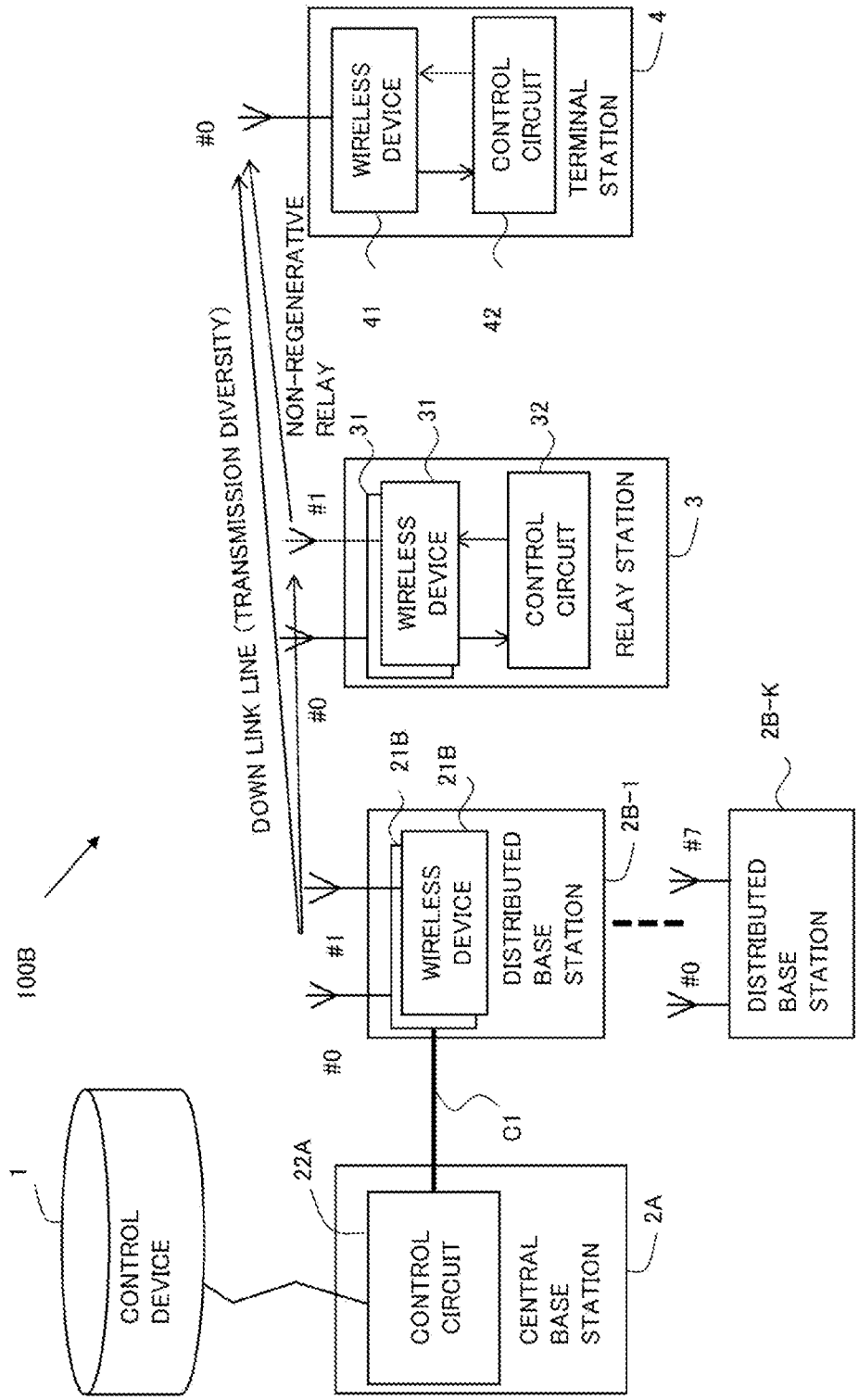
FIG. 2 is a diagram illustrating a second configuration example of the communication system according to the embodiment.

FIG. 2 is a diagram illustrating a second configuration example of the communication system. As the communication system, a communication system 100B according to the second configuration example as illustrated in FIG. 2 may be applied. The communication system 100B differs from the communication system 100A of FIG. 1 in the following points. That is, the communication system 100B includes a central base station 2A and one or more distributed base stations 2B in place of the base station 2. When one or more distributed base stations 2B are distinguished individually, the distributed base stations 2B are given branch numbers, like distributed base stations 2B-1, . . . , 2B-K. Here, branch number K is an integer indicating the number of distributed base stations. In FIG. 2, the distributed base stations 2B-1 and 2B-K are illustrated. However, when the distributed base stations 2B-1, . . . , 2B-K are collectively referred to, the distributed base stations 2B-1, . . . , 2B-K are simply described as distributed base stations 2B.

The central base station 2A includes a control circuit 22A. Further, the distributed base station 2B includes a wireless device 21B corresponding to antennas #0 and #1. The control circuit 22A of the central base station 2A and the wireless device 21B of the distributed base station 2B are connected by, for example, an optical fiber C1 or a wireless network. A topology of the optical fiber C1 connecting the central base station 2A and the plurality of distributed base stations 2B is not limited to a specific topology. For example, the topology of the optical fiber C1 may be a one-to-one connection between nodes, a network branching as a distance from the central base station 2A increases, a star network, a ring network, or the like. Further, when the control circuit 22A of the central base station 2A and the wireless device 21B of the distributed base station 2B are connected by the wireless network, a standard and protocol of the adopted wireless network are not limited to specific ones.

The control circuit 22A includes a processor and a memory, like the control circuit 22 of FIG. 1. The processor controls communication with the control device 1 and wireless communication with the relay station 3 and the terminal station 4 according to the computer program stored in the memory. That is, the control circuit 22A controls wireless communication with the relay station 3 and the terminal station 4 via the wireless device 21B of the one or more distributed base stations 2B. Since configurations of the relay station 3 and the terminal station 4 are the same as those of the communication system 100A, repeated description thereof will be omitted.

The following configuration is adopted as a premise for the communication systems 100A and 100B. In the communication systems 100A and 100B, communication according to time division multiplexing is performed, and the same frequency channel is used for uplink and downlink. In addition, start timings of respective slots constituting a radio frame are synchronized between the base station 2, the relay station 3, and the terminal station 4.

In the communication systems 100A and 100B, a block transmission scheme with a cyclic prefix (CP) such as Cyclic Prefix-Orthogonal Frequency Division Multiplexing (CP-OFDM) is adopted as a radio modulation scheme. Although a case in which CP-OFDM is applied will be described in the present embodiment, a block transmission scheme with CP other than CP-OFDM may also be used. In addition, the relay station 3 shares resource block information that is used in the uplink and the downlink by the terminal station 4 that is a relay target.

The uplink is a link in a direction from the terminal station 4 to the base station 2. The downlink is a link in a direction from the base station 2 to the terminal station 4. The following description illustrates a case in which the non-regenerative relay is performed in a downlink direction. That is, for the transmission station, the base station 2 corresponds to the "transmission station" and the terminal station 4 corresponds to the "reception station". However, the non-regenerative relay performed by the relay station 3 in the embodiment may also be applied to communication in an uplink direction.

The relay station 3 assigns a delay to a relay signal, that is, a signal that is non-regeneratively relayed to the terminal station 4 (the second radio signal). The relay station 3 calculates a timing at which the relay signal is caused to arrive at the terminal station 4. The relay station 3 calculates a delay time (corresponding to the amount of delay) to be assigned, on the basis of propagation characteristics of radio waves between the base station 2 and the relay station 3, propagation characteristics of radio waves between the relay station 3 and the terminal station 4, and signal processing time in the relay station 3 so that the relay signal transmitted from each antenna (antennas #0 and #1) reaches the terminal station 4 at a desired timing. The propagation characteristics of radio waves include, for example, propagation delay, spread of delay, and amount of phase rotation. However, information included in the propagation characteristics of radio waves is not limited thereto. The propagation delay is a time taken for a signal to reach a reception side apparatus after the signal is transmitted from a transmission side apparatus. The spread of the delay is a time taken for reception of a signal to be completed after the signal starts to reach the reception side apparatus.

Figure 3:
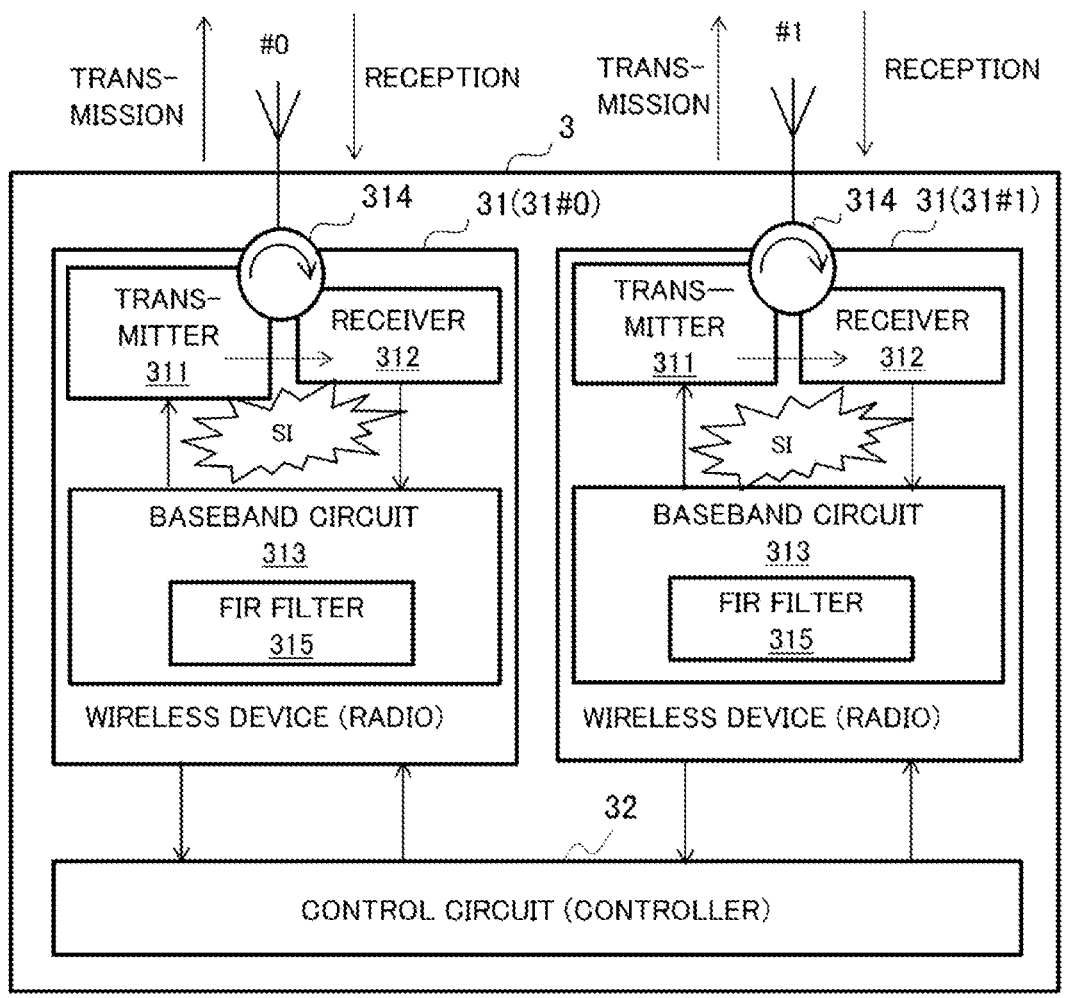
FIG. 3 is a diagram illustrating a hardware configuration example of a relay station.

FIG. 3 is a diagram illustrating an example of a hardware configuration of the relay station 3. The relay station 3 includes two antennas #0 and #1 (an example of a plurality of antennas), a plurality of wireless devices 31 (wireless devices 31 #0 and 31 #1) corresponding to the plurality of antennas (antennas #0 and #1), and a control circuit 32 (an example of a controller). In the following description, the wireless device 31 #0 and the wireless device 31 #1 are referred to as the wireless device 31 when not distinguished from each other.

Each of the wireless devices 31 #0 and 31 #1 has the same configuration. That is, the wireless device 31 includes a transmitter 311, a receiver 312, and a baseband circuit 313. The transmitter 311 and the receiver 312 are connected to antenna (#0 or #1) via a circulator 314. That is, the transmitter 311, the receiver 312, and the antenna (#0 or #1) are connected to three ports of the circulator 314. A reception signal received by the antenna (#0 or #1) is input to a first port of the circulator 314 and transferred from the second port to the receiver 312. A transmission signal from the transmitter 311 is input to, for example, the third port of the circulator 314, and transferred from the first port to the antenna (#0 or #1).

Here, a power difference between the transmission signal and the reception signal is, for example, about 100 dB. On the other hand, isolation of the circulator 314 is on the order of 30 dB, and a part of the transmission signal interferes with the reception signal. Interference between the part of the transmission signal and the reception signal in the wireless device 31 is called self-interference. The self-interference is curbed by use of both of a radio frequency (RF) analog filter in the receiver 312 and an FIR filter 315 included in the baseband circuit 313.

The receiver 312 receives a reception signal (for example, a radio signal (the first radio signal) from the base station 2) from the antenna (#0 or #1) via the circulator 314. The receiver 312 includes a quadrature detection circuit and an analog-to-digital (AD) converter. The receiver 312 down-converts the reception signal through quadrature detection, and converts the signal into digital data using the AD converter to obtain a baseband signal. The receiver 312 inputs the obtained baseband signal to the baseband circuit 313.

The baseband circuit 313 is a digital circuit including the FIR filter 315. The baseband signal as a reception signal is input to the FIR filter 315. The FIR filter 315 curbs a self-interfering transmission signal mixed in the baseband signal and delays the baseband signal by a predetermined delay time. The baseband circuit 313 inputs an output signal of the FIR filter 315 (a signal filtered by the FIR filter 315) to the transmitter 311. Thus, the relay station 3 includes a plurality of FIR filters corresponding to a plurality of antennas.

The transmitter 311 includes a digital-to-analog (DA) converter and a modulation circuit. The transmitter 311 converts the reception signal from the baseband circuit 313 into an analog signal to generate a radio signal (an RF signal, such as a second radio signal to be transmitted to the terminal station 4) using the modulation circuit. The transmitter 311 transmits the radio signal as a relay signal from the antenna (#0 or #1) via the circulator 314.

The control circuit 32 can be configured of, for example, a processor such as a CPU, an integrated circuit such as an FPGA, or a combination thereof. The control circuit 32 controls non-regenerative relay processing. More specifically, the control circuit 32 can measure the propagation characteristics of the propagation path (path), calculate the delay amount corresponding to the antenna, and set the delay amount for the FIR filter 315. Further, the control circuit 32 can calculate a weight for curbing the self-interference and set the weight in the FIR filter. Setting of weight for curbing the self-interference is optional. The control circuit 32 is an example of a "controller".

A hardware configuration of the relay station 3 is not limited to the configuration illustrated in FIG. 3. For example, the relay station 3 may separately include a control channel antenna to which the control circuit 32 is connected.

Figure 4:
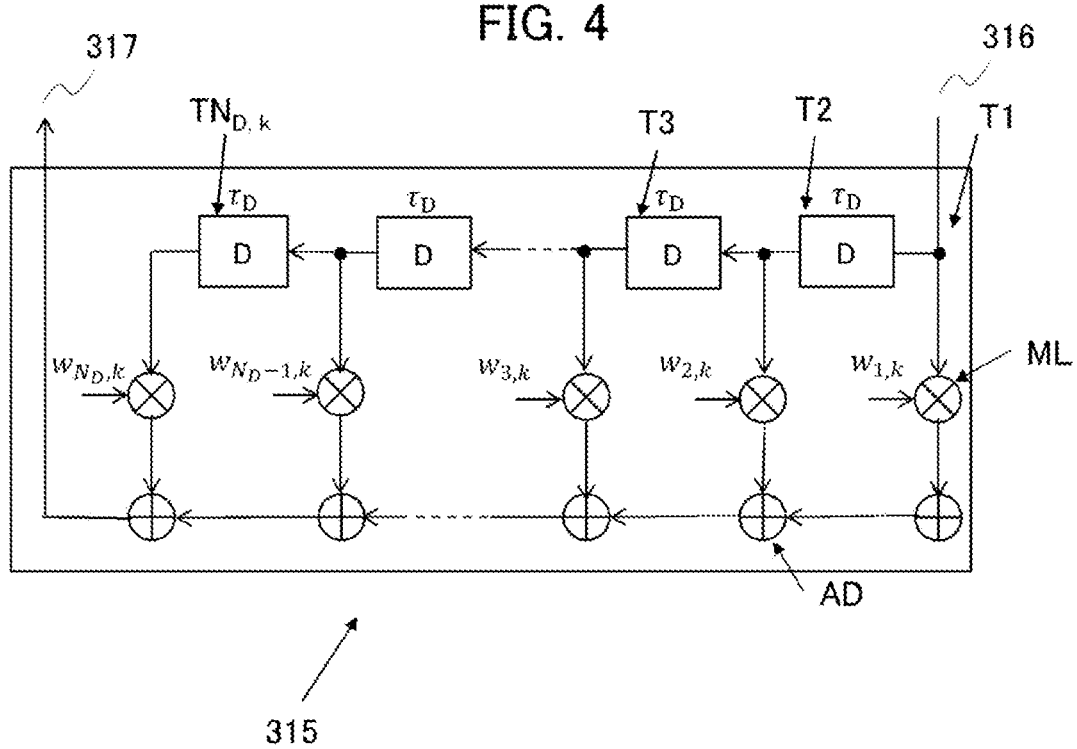
FIG. 4 is a diagram illustrating a configuration example of an FIR filter.

FIG. 4 is a diagram illustrating a configuration example of the FIR filter 315. The FIR filter 315 is prepared for each antenna #k (k=0, 1, . . . , $N_{(R)}-1$). The FIR filter 315 includes an input terminal 316, an output terminal 317, and $N_{(D, k)}$ stages of taps (T1, T2, . . . , $TN_{(D, k)}$). Characters in parentheses following an underline after alphabet correspond to subscripts in the figure. Each of the taps other than the tap T1 includes a delay device (delay element) D that delays an input signal by a delay time $\tau_{(D)}$, and a multiplier ML that multiplies a complex weight $w_{(k)}$.

The tap T1 does not have the delay device D, and weights the input signal from the input terminal 316 with a weight $w\_(1, k)$ using the multiplier ML. The tap T2 delays the input signal with the delay device D (delay time $\tau\_(D)$) and weights the signal with weight $w\_(2, k)$ with the multiplier ML. The same applies to the tap T3 and subsequent taps. Therefore, at the tap $TN\_(D, k)$ at the last stage, a delay time $\tau\_D \times (N (D, k)-1)$ is assigned to the input signal to the tap T1 (the input signal to the FIR filter 315), and a weight $w\_(N\_(D,k))$ is weighted. Signals processed by the respective taps $(T1, T2, \ldots, TN\_(D, k))$ are added by an adder AD and output from an output terminal 317. With the above configuration, the input signal to the FIR filter 315 is subjected to weighted average, an interference signal and noise other than the reception signal are removed, and only the delay time $\tau\_(D) \times (N (D, k)-1)$ is delayed.

The number of taps $N (D, k)$ used by the FIR filter 315 and the weight $w\_(k)$, that is, $w\_(1, k)$ to $w\_(N\_(D, k), k)$ are calculated by the control circuit 32. Details will be described below.

Figure 5:
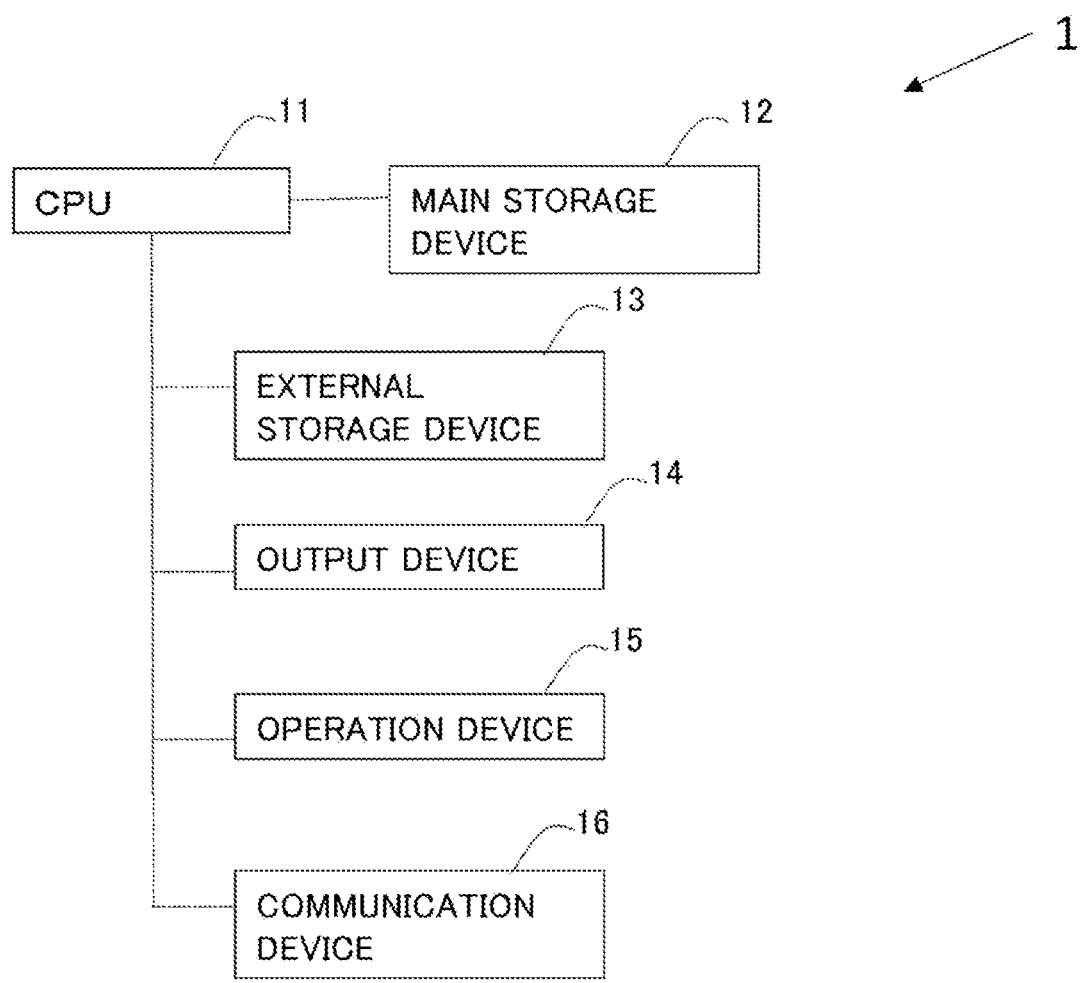
FIG. 5 is a diagram illustrating a hardware configuration of a control device.

FIG. 5 is a diagram illustrating a hardware configuration of the control device 1. The control device 1 includes a CPU 11, a main storage apparatus 12, and an external device, and executes communication processing and information processing according to computer program. The CPU 11 is also called a processor. The CPU 11 is not limited to a single processor, and may have a multiprocessor configuration. Further, the CPU 11 may include a graphics processing unit (GPU), a digital signal processor (DSP), and the like. Further, the CPU 11 may cooperate with a hardware circuit such as a field programmable gate array (FPGA). An external storage apparatus 13, an output apparatus 14, an operation apparatus 15, and a communication apparatus 16 are illustrated as external devices.

The CPU 11 executes the computer program developed in the main storage apparatus 12 and provides processing of the control device 1. The main storage apparatus 12 stores computer programs executed by the CPU 11, data processed by the CPU 11, and the like. The main storage apparatus 12 is a dynamic random access memory (DRAM), a static random access memory (SRAM), a read only memory (ROM), or the like. Further, the external storage apparatus 13 is used, for example, as a storage area that assists the main storage apparatus 12, and stores computer programs executed by the CPU 11, data processed by the CPU 11, and the like. The external storage apparatus 13 is a hard disk drive, a solid state drive (SSD), or the like. Further, a drive device of a removable storage medium may be connected to the control device 1. The removable storage medium is, for example, a Blu-ray disc, a digital versatile disc (DVD), a compact disc (CD), or a flash memory card.

The output apparatus 14 is, for example, a display apparatus such as a liquid crystal display or an electroluminescence panel. However, the output apparatus 14 may include a speaker or other apparatus that outputs sound. The operation apparatus 15 is, for example, a touch panel in which a touch sensor is superimposed on a display. The communication apparatus 16, for example, communicates with the base station 2 and an external network such as the Internet via an optical fiber. The communication apparatus 16 is, for example, a gateway that communicates with a gateway connected to the base station 2 and the external network such as the Internet. The communication apparatus 16 may be one apparatus or may be a combination of a plurality of apparatuses. A hardware configuration of the control device 1 is not limited to configuration illustrated in FIG. 5. Further, the control circuit 32 of the relay station 3 described above may be configured as an apparatus including the CPU 11, the main storage apparatus 12, and the external storage apparatus 13 described above.

Figure 6:
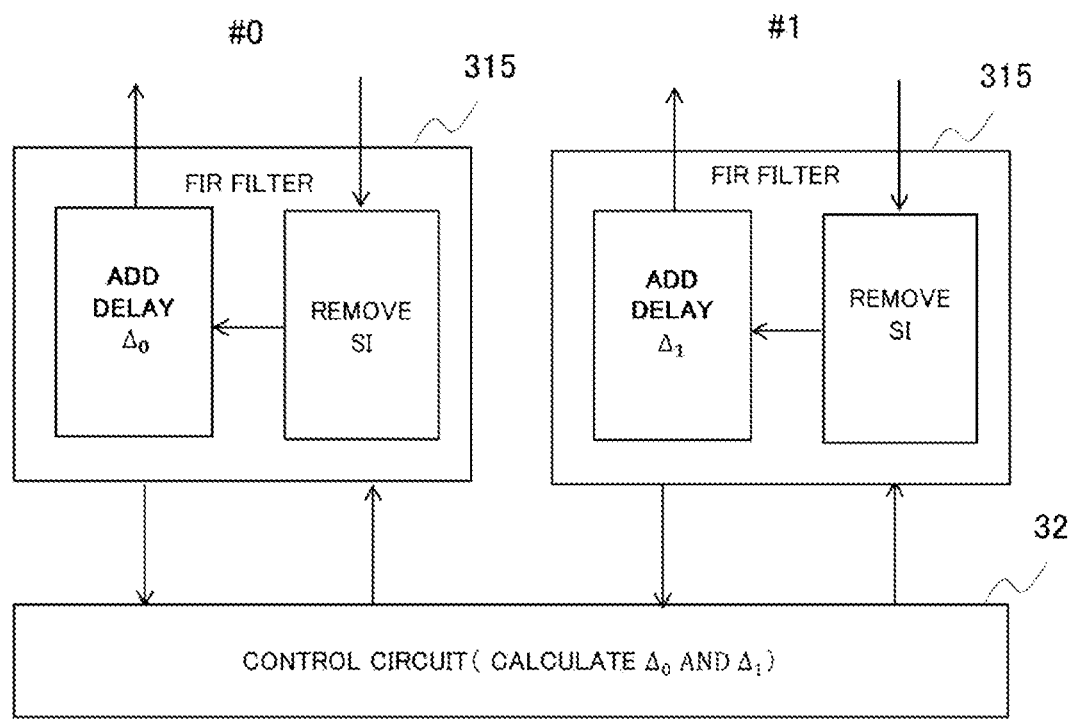
FIG. 6 is an illustrative diagram of processing in the relay station.
Figure 7:
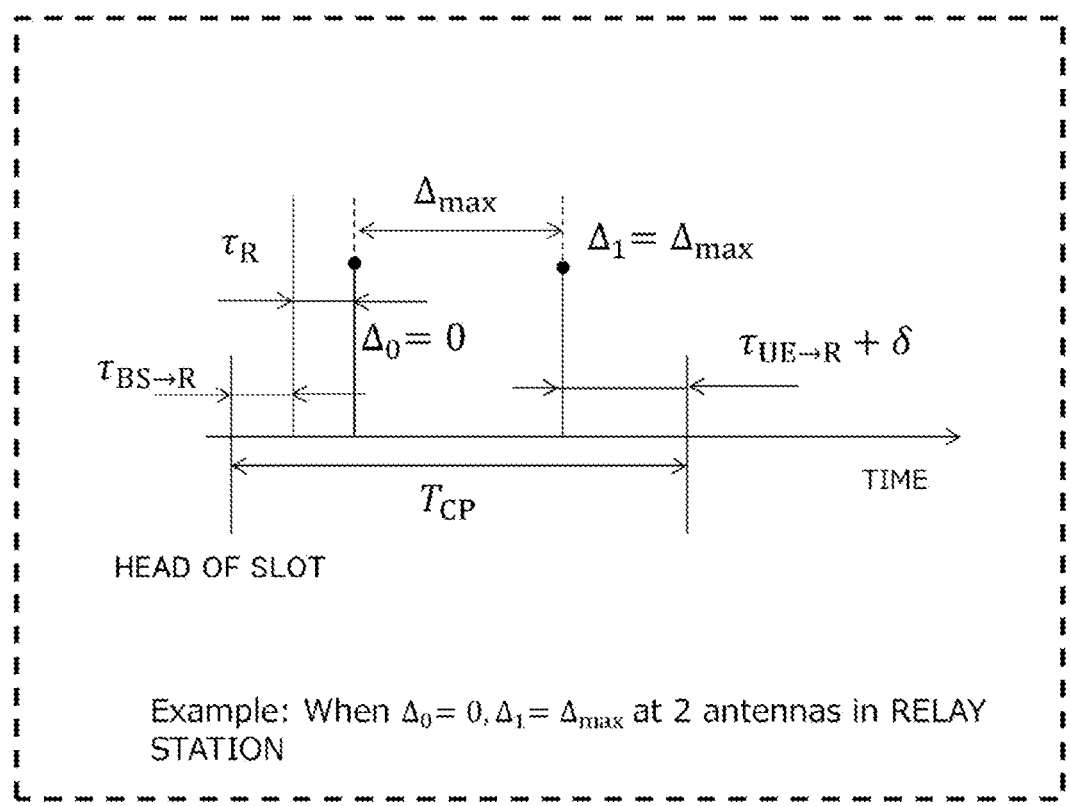
FIG. 7 is an illustrative diagram of processing in the relay station.

FIGS. 6 and 7 are illustrative diagrams of processing in the relay station 3. As illustrated in FIG. 6, in the relay station 3, the control circuit 32 calculates a delay time $\Delta\_(0)$ to be assigned to an antenna #0 and a delay time $\Delta\_(1)$ to be assigned to an antenna #1. The FIR filters 315 corresponding to the antennas #0 and #1 perform removal of self-interference (SI) and assignment of delay times $\Delta\_(0)$ or $\Delta\_(1)$ on an input baseband signal and output a signal after processing.

FIG. 7 illustrates a calculation example when the relay station 3 has two antennas (#0 and #1), delay time $\Delta\_(0)=0$, and $\Delta\_(1)=\Delta\_(max)$. The relay station 3 communicates with the base station 2 and the terminal station 4 using CP-OFDM. The calculation of the delay times $\Delta\_(0)$ and $\Delta\_(1)$ is performed for each radio frame or for each slot constituting the radio frame.

In CP-OFDM, radio signals reaching the reception station between a beginning of the slot and the lapse of a cyclic prefix (CP) time, that is, a time length of CP (CP length=5 ρsec) are normally combined to contribute to improvement of the diversity gain. Therefore, in FIG. 7, the CP length (CP time) is shown as allowable delay $T\_(CP)$.

"$\tau\_(BS \to R)$" illustrated in FIG. 7 indicates the propagation delay in the radio signal propagation path from the base station 2 (BS) to the relay station 3 (R). A propagation delay $\tau\_(BS \to R)$ is measured (calculated) from a reference signal such as a control channel transmitted from the base station 2 (BS) to the terminal station 4 (UE), which is received by the relay station 3.

Further, "$\tau\_(R)$" illustrated in FIG. 7 is a processing delay in the relay station 3(R), and can be calculated by, for example, a calculation equation "the number of delay units of the FIR filter 315 $(N\_(D, k)-1) \times$ delay time $\tau\_(D)$ per tap".

Further, "$\tau\_(UE \to R)$" illustrated in FIG. 7 indicates a propagation delay in the radio signal propagation path from the terminal station 4 (UE) to the relay station 3 (R). The propagation delay $\tau\_(UE \to R)$ is measured (calculated) from a reference signal such as a control channel transmitted from the terminal station 4 (UE) to the base station 2 (BS), which is received by the relay station 3.

Further, "$\delta$" illustrated in FIG. 7 is a value indicating a measurement deviation and delay spread. When a value of $\delta$ is calculated for the downlink, the value can be calculated through the reception of the reference signal between the relay station 3 (R) and the terminal station 4 (UE) and the reception of the reference signal from the terminal station 4 (UE) to the base station 2 (BS).

Further, "$\Delta\_(max)$" illustrated in FIG. 7 represents a maximum value (maximum delay) of the delay time that can be assigned to the baseband signal input to the FIR filter 315 in the allowable delays $T\_(CP)$. The maximum delay $\Delta\_(max)$ can be calculated using, for example, a calculation equation "$\Delta\_(max)=T\_(CP)-(\tau\_(UE \to R)+\tau\_(R)+\tau\_(BS \to R)+\delta)$".

The propagation delay $\tau\_(BS \to R)$, a processing delay $\tau\_(R)$, the propagation delay $\tau\_(UE \to R)$, $\delta$, and the maximum delay $\Delta\_(max)$ can be measured and calculated by the control circuit 32. However, the measurement and calculation may be performed outside the control circuit 32.

The control circuit 32 calculates a different delay time (delay amount) $\Delta\_(k)$ for each antenna of the relay station 3(R) so that the inequality "$\Delta\_(k) \leq \Delta\_(max)$" is satisfied, and sets $\Delta\_(k)$ in the FIR filter 315. Here, the delay time $\Delta\_(k)$ is set in the FIR filter 315 in a state in which the delay time $\Delta_{\_}(k)$ is discretized by a delay amount $(\tau_{\_}(D))$ per tap included in the FIR filter 315.

For example, the control circuit 32 calculates the delay time $\Delta_{\_}(k)$ for the antenna #k with respect to the number $N_{\_}(R)$ of antennas included in the relay station 3, using a calculation equation "$\Delta_{\_}(k)=k\cdot\Delta_{\_}(max)/(N_{\_}(R)-1)$". In this case, when the number of antennas is two, the delay time $\Delta_{\_}(0)$ is 0 and the delay time $\Delta_{\_}(1)$ is $\Delta_{\_}(max)$, as illustrated in FIG. 7. That is, a transmission timing of the radio signal (the second radio signal) from the antenna #0 is immediately after the end of the processing delay $\tau_{\_}(R)$, and a transmission timing of the radio signal (the second radio signal) from the antenna #1 is the timing $\Delta_{\_}(max)$ after the transmission timing from the antenna #0. Accordingly, the radio signal transmitted from the antenna #1 reaches the terminal station 4 before $\tau_{\_}(UE{\rightarrow}R)+\delta$ elapses (CP time expires).

When the number of antennas is three, $\Delta_{\_}(0)$ is 0, $\Delta_{\_}(1)$ is $\Delta_{\_}(max)/2$, and $\Delta_{\_}(2)$ is $\Delta_{\_}(max)$. That is, the delay time $\Delta_{\_}(k)$ for each antenna is calculated so that the transmission timing of the radio signal shifts from a start time of $\Delta_{\_}(max)$ at equal intervals.

Figure 8:
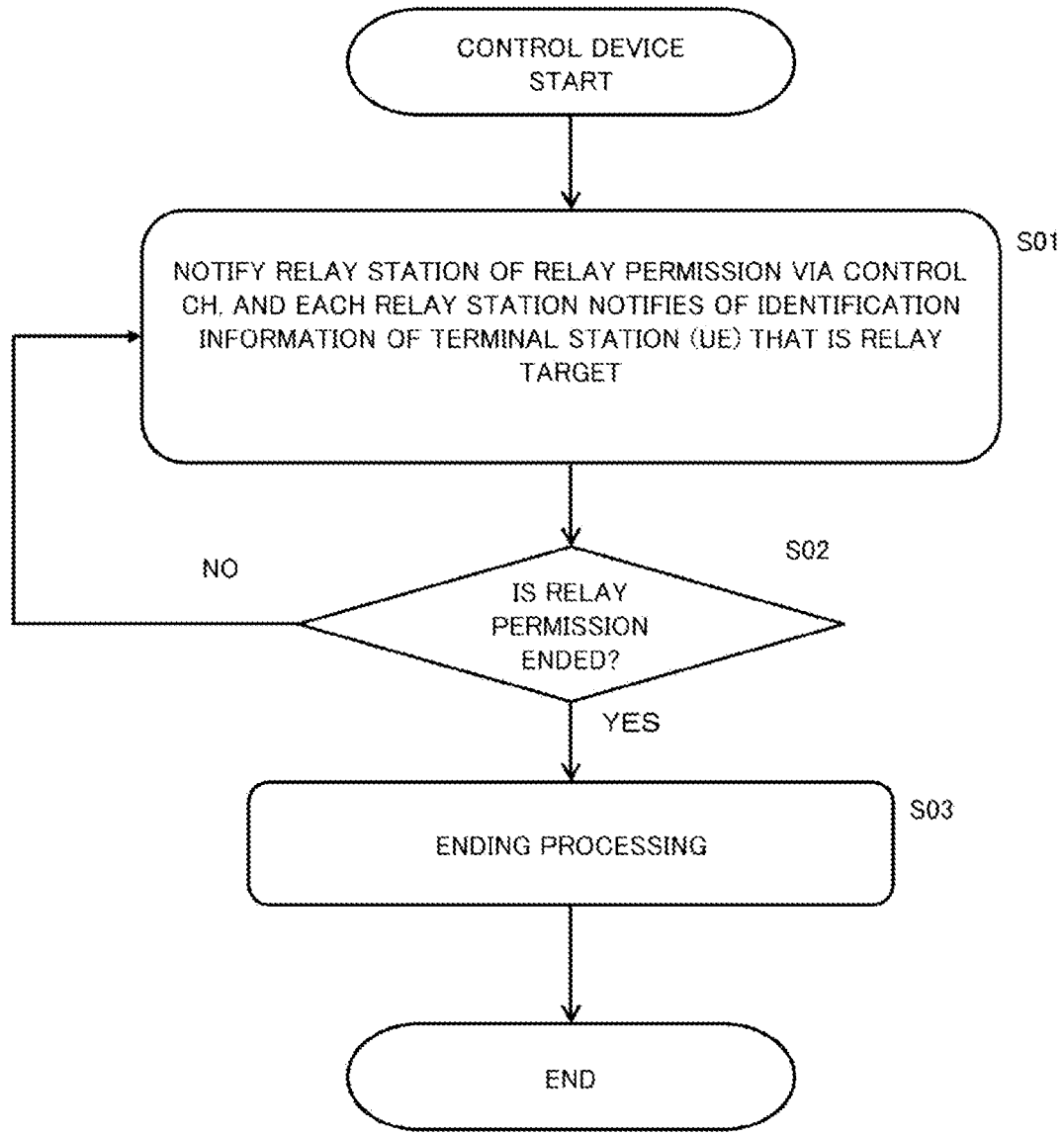
FIG. 8 is a flowchart illustrating an example of processing of the control device.

FIG. 8 is a flowchart illustrating an example of processing the control device 1. The processing illustrated in FIG. 8 is performed by the CPU 11 of the control device 1, for example. In step S01, the control device 1 notifies the relay station 3 of relay permission (transmits a message including a relay permission instruction) via the control channel. The control device 1 also notifies of (transmits) identification information of the terminal station 4 (UE) that is a relay target of each relay station 3. Step S01 is performed, for example, when the base station 2 (transmission station) starts transmission of radio signals to the terminal station 4 (reception station) using the downlink. In this case, the base station 2 transmits a radio signal to which the transmission diversity using a plurality of antennas (for example, antennas #0 and #1) is applied. However, the base station 2 may transmit a radio signal not subjected to the transmission diversity using a single antenna.

In step S02, the control device 1 determines whether or not a condition for ending the relay permission is satisfied. When a determination is made that the condition is satisfied, the processing returns to step S01 and otherwise, the processing proceeds to step S03.

In step S03, the control device 1 performs end processing. For example, the control device 1 stops notification of the relay permission. Alternatively, the control device 1 transmits an instruction to end the relay to the relay station 3. Thereafter, the control device 1 ends the processing. Thus, the non-regenerative relay in the relay station 3 is performed on the basis of the instruction (the relay permission) from the control device 1.

Figure 9:
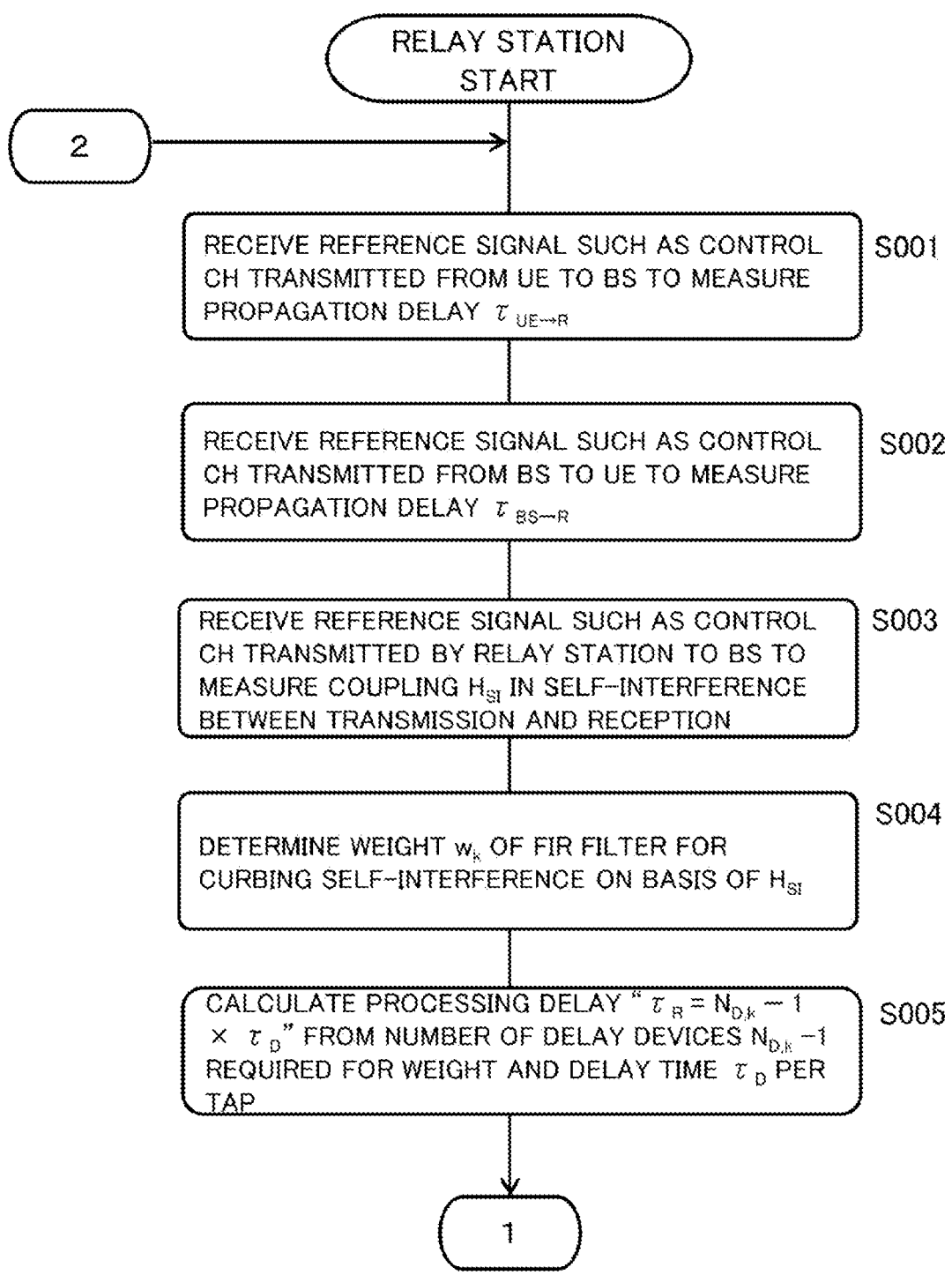
FIG. 9 is a flowchart illustrating an example of processing of the relay station.
Figure 10:
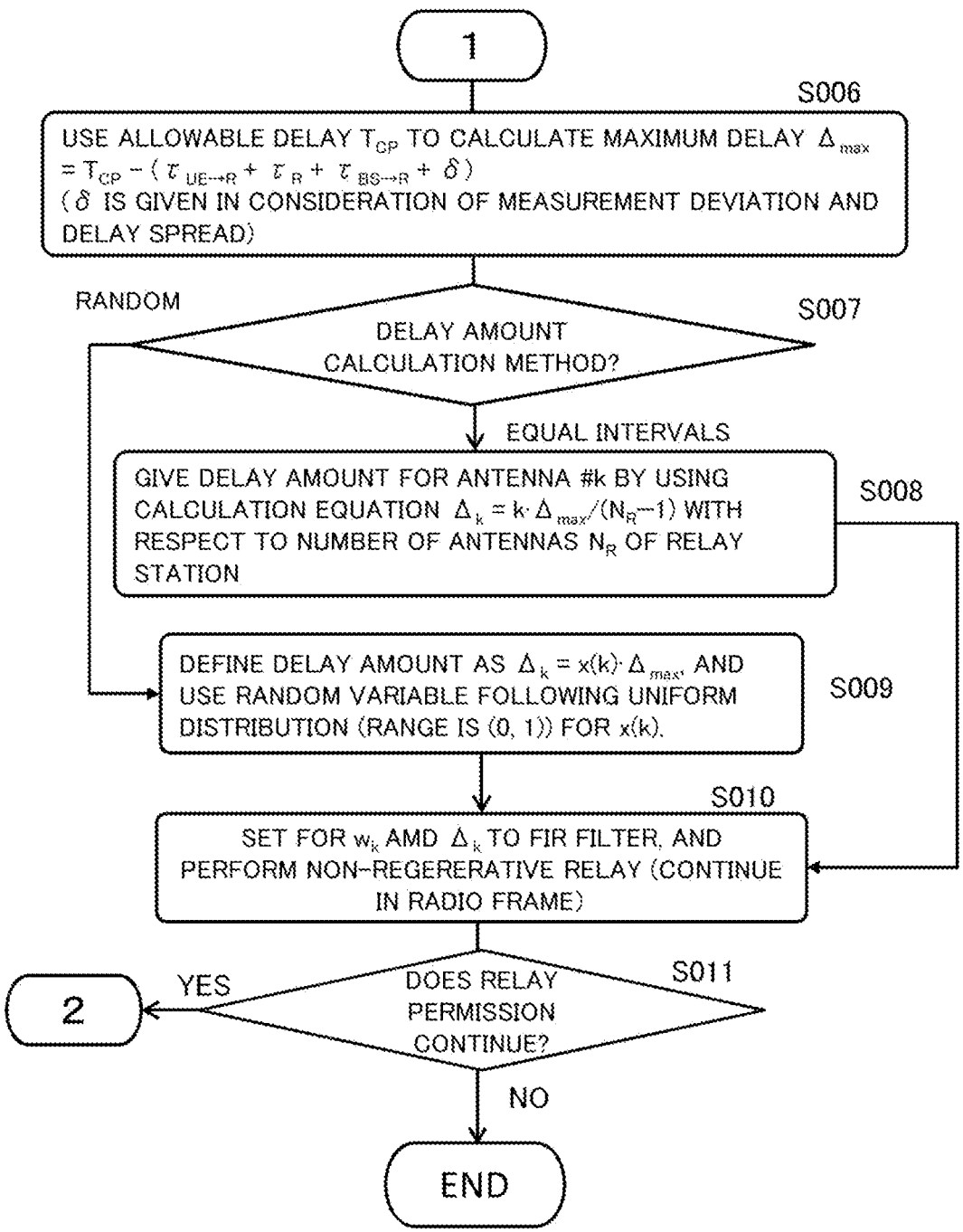
FIG. 10 is a flowchart illustrating an example of processing by the relay station.

FIGS. 9 and 10 are flowcharts illustrating examples of processing of the relay station 3. The processing illustrated in FIGS. 9 and 10 is executed by the control circuit 32 of the relay station 3, for example. Further, the processing illustrated in FIGS. 9 and 10 is started when an instruction (control signal) including the relay permission from the control device 1 is received.

In step S001, the control circuit 32 uses a reference signal such as a control channel (control CH) transmitted from the terminal station 4 (UE) to the base station 2 (BS), which is received by the relay station 3 (R), to measure the propagation delay $\tau_{\_}(UE{\rightarrow}R)$ of a radio signal transmission path from the terminal station 4 to the relay station 3. When there are a plurality (two or more) of target terminal stations 4, the control circuit 32 determines the value of the maximum propagation delay to be $\tau_{\_}(UE{\rightarrow}R)$.

In step S002, the control circuit 32 uses a reference signal such as a control CH transmitted from the base station 2 (BS) to the terminal station 4 (UE), which is received by the relay station 3 (R), to measure the propagation delay $\tau_{\_}(BS{\rightarrow}R)$ of the propagation path of the radio signal from the base station 2 to the relay station 3.

In step S003, the control circuit 32 uses a reference signal such as a control CH transmitted by the relay station 3 to the base station 2, which is received by the relay station 3, to measure the coupling $H_{\_}(SI)$ in self-interference (SI) between the transmitter 311 and the receiver 312.

In step S004, the control circuit 32 determines (calculates) the weight $w_{\_}(k)$ of the FIR filter 315 for curbing self-interference on the basis of the coupling $H_{\_}(SI)$.

In step S005, the control circuit 32 calculates the processing delay $\tau_{\_}(R)$ from the number of taps $N_{\_}(D, k)$ required for the weight and the delay time $\tau_{\_}(D)$ per tap. For example, the control circuit 32 calculates $\tau_{\_}(R)$ using a calculation equation "$\tau_{\_}(R)=(N_{\_}(D, k)-1)\times\tau_{\_}(D)$".

An order of processing from step S001 to step S005 is an example, and the order may be changed in any way.

In step S006, the control circuit 32 uses the allowable delay $T_{\_}(CP)$, the propagation delay $\tau_{\_}(UE{\rightarrow}R)$, the propagation delay $\tau_{\_}(BS{\rightarrow}R)$, the processing delay $\tau_{\_}(R)$, and $\delta$ to calculate the maximum delay $\Delta_{\_}(max)$.

In step S007, the control circuit 32 determines whether a delay time calculation method is for calculation giving a delay such that transmission intervals of radio signals from the respective antennas are equal (that is, the transmission timing occurs at equal intervals) or for calculation giving a random delay. In the case of the calculation assigning the delays at equal intervals, the processing proceeds to step S008, and in the case of the random calculation, the processing proceeds to step S009. When the number of antennas is large and it is certain that signals overlap at equal intervals $(\Delta_{\_}(max)/(N_{\_}(R)-1)<\delta$ (delay spread+deviation)), random switching is conceivable.

In step S008, the control circuit 32 calculates the delay time for the antenna #k with respect to the number of antennas $N_{\_}(R)$ of the relay station 3 by using a calculation equation "$\Delta_{\_}k=k\cdot\Delta_{\_}(max)/(N_{\_}(R)-1)$". Thereafter, the processing proceeds to step S010.

In step S009, the control circuit 32 calculates the delay time using a calculation equation "$\Delta_{\_}(k)=x_{\_}(k)\cdot\Delta_{\_}(max)$". In this case, $x_{\_}(k)$ is calculated by giving a random variable following a uniform distribution (range (0, 1)).

In step S010, the non-regenerative relay is performed. That is, the control circuit 32 sets the weight $w_{\_}(k)$ and the delay time $\Delta_{\_}(k)$ in each FIR filter 315. In each wireless device 31 (each of 31 #0 and 31 #1), the receiver 312 converts the radio signal (the first radio signal) from the base station 2 (transmission station) received by the corresponding antenna #0 or #1 into a baseband signal and inputs the baseband signal to the corresponding FIR filter 315. The FIR filter 315 performs filtering based on the setting of the weight $w_{\_}(k)$ and the delay times $\Delta_{\_}(k)$. The output signal of the FIR filter 315 is input to the transmitter 311. The transmitter 311 converts the input signal into a radio signal (the second radio signal) directed to the terminal station 4. The second radio signal is radiated (transmitted) from the corresponding antenna #0 or #1. The processing is performed for each slot of the downlink of the radio frame. However, the processing can be performed on each slot of the uplink.

In step S011, the control circuit 32 determines whether or not the relay permission notification continues, that is, determines whether or not the non-regenerative relay processing ends. In this case, when a determination is made that the non-regenerative relay processing ends, processing of FIG. 10 ends, and when a determination is made otherwise, the processing returns to step S001. Parameters (propagation delay, processing delay, and δ) used for calculation of Δ_(max) are updated in units of slots or in units of radio frames.

According to the embodiment, each of the communication systems 100A and 100B includes a transmission station (the base station 2 or the distributed base station 2B-1), a reception station (the terminal station 4) having one antenna, and at least one relay station 3 capable of executing the non-regenerative relay for the first radio signal transmitted from the transmission station to the reception station.

The relay station 3 includes a plurality of antennas (antennas #0 and #1), a plurality of wireless devices 31 corresponding to the plurality of antennas, and a controller (control circuit 32) that controls operations of the plurality of wireless devices 31. Each of the plurality of wireless devices 31 includes the receiver 312 that converts the first radio signal received from the transmission station (the base station 2 or the distributed base station 2B-1) using the corresponding antenna #0 or #1 into the baseband signal, the FIR filter 315 that assigns a delay to the baseband signal, and the transmitter 311 that converts the signal output from the FIR filter 315 into the second radio signal that is transmitted from the corresponding antenna #0 or #1 to the reception station (terminal station 4). The control circuit 32 (controller) sets different delay times in the FIR filters 315 in the plurality of wireless devices 31 so that the FIR filter 315 assigns delays different among the plurality of antennas to the baseband signal input from the receiver 312 in each of the plurality of wireless devices 31.

With the configuration of the relay station 3 described above, it is possible to give delay diversity to the second radio signal that the relay station 3 transmits to the reception station using a plurality of antennas. This makes it possible for the reception station to obtain a diversity effect for the second radio signal and improve SIR and SINR.

In this case, when the first radio signal to which the transmission diversity using a plurality of antennas has been applied is transmitted from the transmission station (the base station 2 or the distributed base station 2B-1), a different delay is assigned to each antenna in the relay station 3, which degrades a correlation between propagation characteristics of the first radio signal that directly reaches the reception station (the terminal station 4) and propagation characteristics of the second radio signal. This makes it possible to improve the diversity gain in the reception station. That is, the reception station can obtain a preferable diversity effect. On the other hand, even when a transmission diversity gain is not obtained in the first radio signal (the transmission diversity is not applied), it is possible to obtain a preferable diversity effect with the reception station through the delay diversity given to the second radio signal.

In the embodiment, the control circuit 32 (controller) can use a first propagation delay ($\tau\_(UE \rightarrow R)$) which is a propagation delay in a propagation path of a radio signal from the reception station to the relay station 3, a second propagation delay ($\tau\_(BS \rightarrow R)$) which is a transmission delay in a propagation path of the radio signal from the transmission station to the relay station 3, and signal processing delay ($\tau\_(R)$) in the relay station 3 to obtain the maximum delay Δ_(max), and calculate the delay time assigned for the plurality of antennas by each FIR filter 315 within a range in which the maximum delay Δ_(max) is not exceeded.

In this case, the control circuit 32 (controller) can calculate the maximum delay Δ_(max) in which at least the first propagation delay ($\tau\_(UE \rightarrow R)$), the second propagation delay ($\tau\_(BS \rightarrow R)$), and the processing delay ($\tau\_(R)$) are reduced from a cyclic prefix time (CP time, that is, T_(CP)) used for communication with the transmission station and the reception station by the relay station 3. However, as shown in the calculation equation of Δ_(max), the value of δ may be further reduced.

The control circuit 32 (controller) may calculate the delay times Δ_(0) and Δ_(1) to be set in the respective FIR filters 315 included in the plurality of wireless devices 31 so that a delay time is assigned to the plurality of antennas #0 and #1 at equal intervals (the maximum delay Δ_(max) is divided at equal intervals). In other words, the delay times Δ_(0) and Δ_(1) set in the respective FIR filters 315 may be calculated so that the transmission timings of the radio signals transmitted from the plurality of antennas #0 and #1 are generated at equal intervals.

Further, the control circuit 32 (controller) may randomly calculate the delay times Δ_(0) and Δ_(1) to be set in the respective FIR filters 315 included in the plurality of wireless devices 31. That is, the delay time for each antenna may be calculated using a scheme other than the equal intervals.

Further, the control circuit 32 (controller) in the embodiment performs weighting on the FIR filter 315 (the setting of weight w_(k)) so that self-interference related to reception of the first radio signal and transmission of the second radio signal is curbed. This makes it possible to assign a delay and curb the self-interference.

Modification Example 1

The above-described embodiment can be modified as in modification example 1 to be described below. In the embodiment, the control circuit 32 of the relay station 3 measures or calculates parameters (propagation delay, processing delay, or the like) for calculating Δ_(k). In Modification example 1, a case in which the control circuit 22 (FIG. 1) of the base station 2 sets the delay time Δ_(k) in place of the control circuit 32 of the relay station 3 will be described. The control circuit 22 may be the control circuit 22A (FIG. 2) of the distributed base stations 2B-1 to 2B-k.

Hereinafter, differences between Modification example 1 and the embodiment will be described. An operation of the control device 1 in Modification example 1 is the same as the operation of the embodiment (FIG. 8). On the other hand, in Modification example 1, processing (operation) in the relay station 3 and the base station 2 is different from the embodiment.

Figure 11:
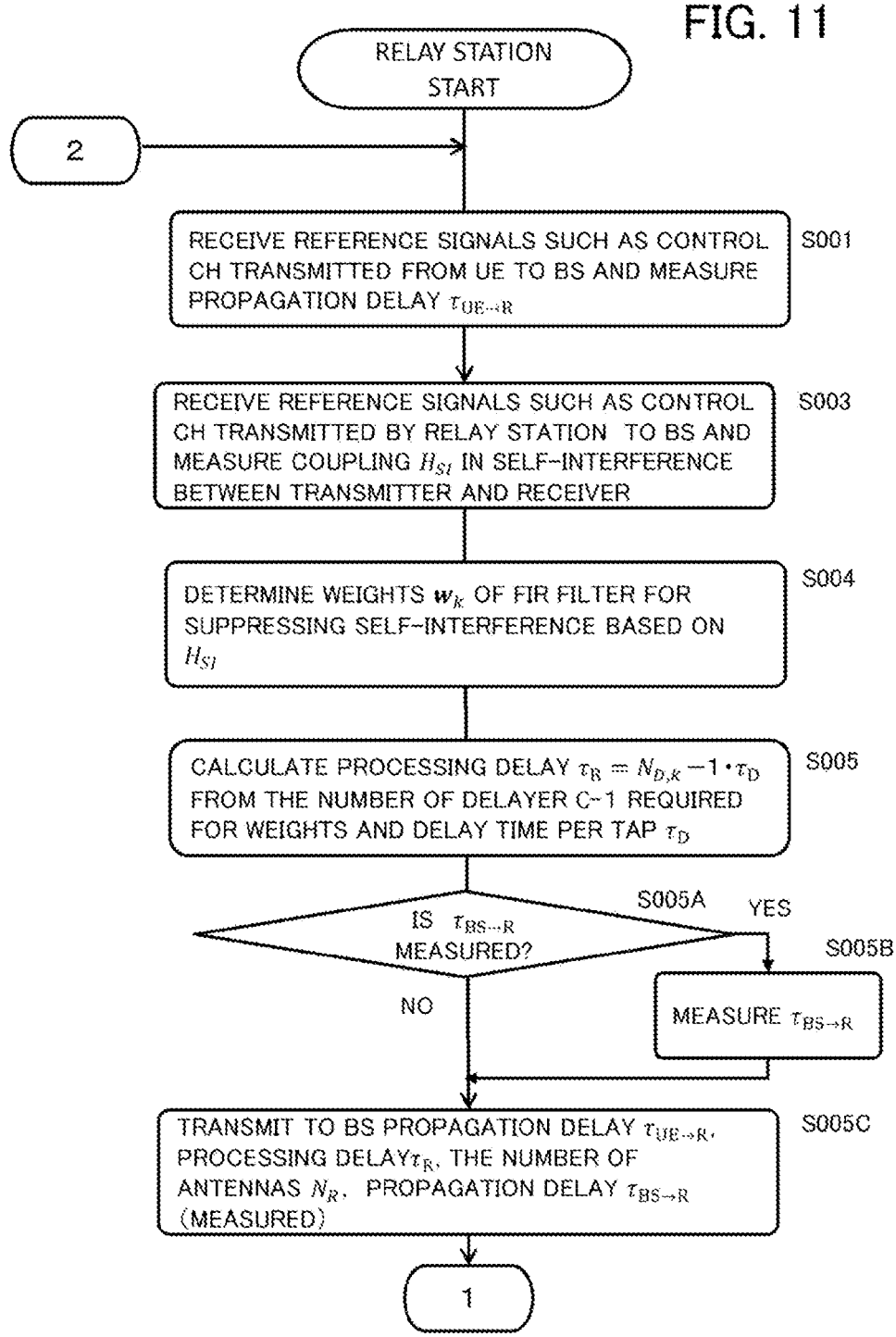
FIG. 11 is a flowchart illustrating an example of processing of a relay station in Modification example 1.
Figure 12:
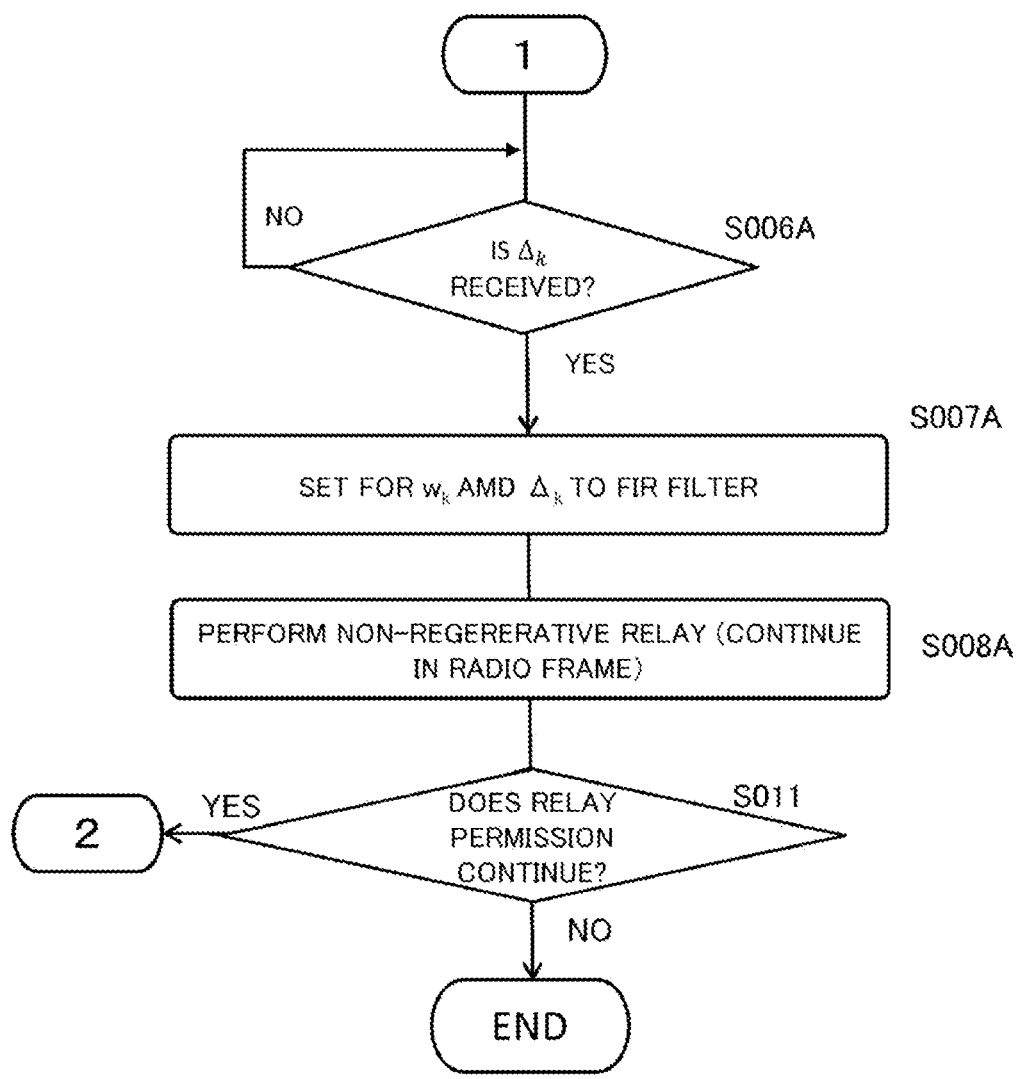
FIG. 12 is a flowchart illustrating an example of processing of the relay station in Modification example 1.
Figure 13:
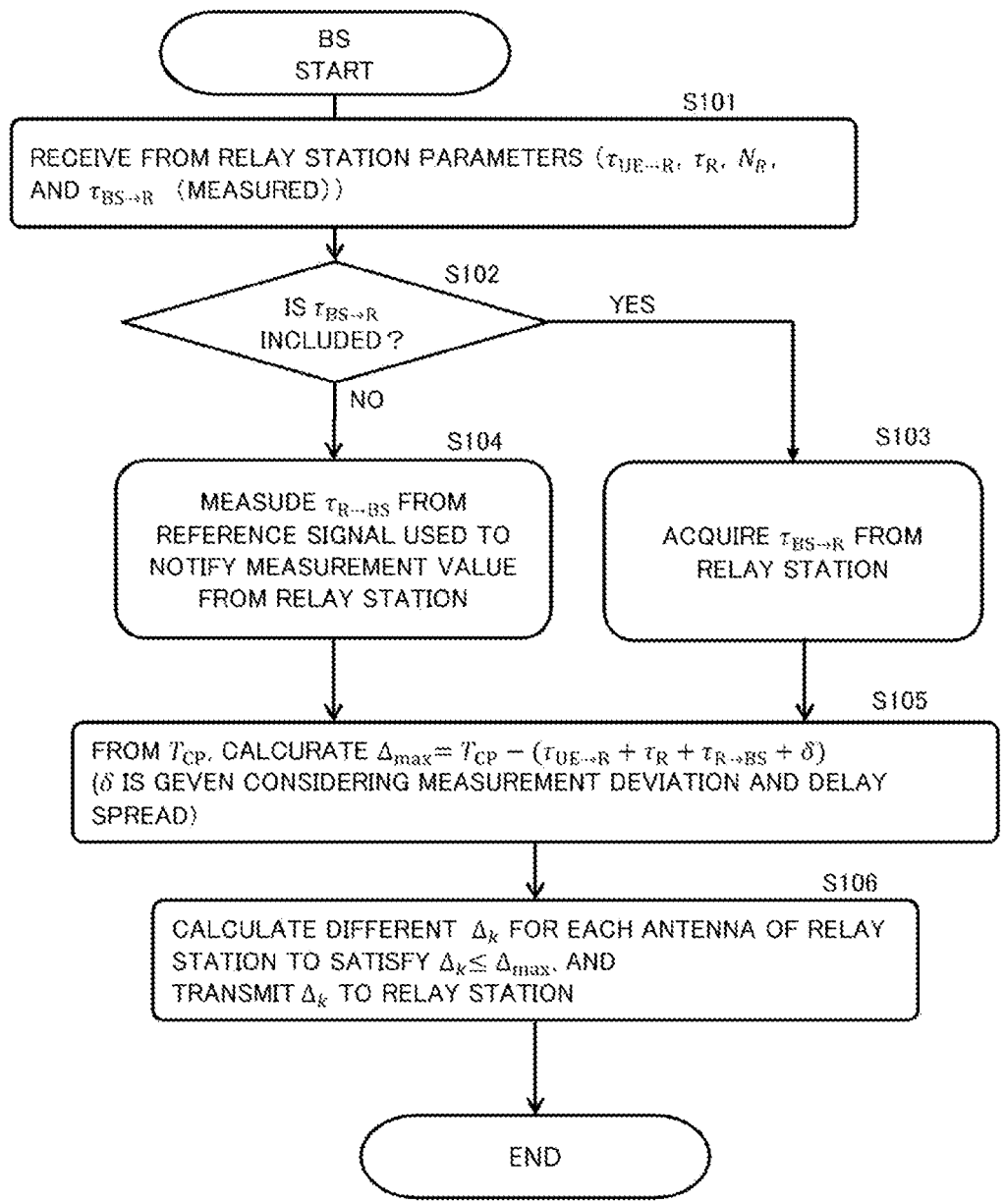
FIG. 13 is a flowchart illustrating an example of processing of a base station in Modification example 1.

FIGS. 11 and 12 are flowcharts illustrating processing (operation) of the relay station 3 in Modification example 1, and FIG. 13 is a flowchart illustrating processing (operation) of the base station 2 in Modification example 1.

In FIG. 11, processing of steps S001, S003, S004, and S005 are the same as in the embodiment (FIG. 9). On the other hand, in Modification example 1, steps S005A and S005B are provided in place of step S002. When the control circuit 32 of the relay station 3 determines that the measurement of the propagation delay $\tau\_(BS \rightarrow R)$ is set (YES in step S005A), the propagation delay $\tau\_(BS \rightarrow R)$ is measured by using the same scheme as described in step S002. The setting can be performed, for example, by setting of a mechanical switch such as a DIP switch or switching a software switch such as a flag. The setting is performed according to an instruction notified of by the base station 2 or the control device 1, for example.

In Modification example 1, step S005C is further provided. In step S005C, the control circuit 32 of the relay station 3 transmits the propagation delay $\tau_{-}(UE{\rightarrow}R)$, the processing delay $\tau_{-}(R)$, and the number of antennas $N_{-}(R)$ to the base station 2. However, when the propagation delay $\tau_{-}(BS{\rightarrow}R)$ is measured in step S005B, the control circuit 32 also transmits the propagation delay $\tau_{-}(BS{\rightarrow}R)$ to the base station 2.

Thus, in Modification example 1, the propagation delay $\tau_{-}(BS{\rightarrow}R)$ is measured according to the setting. However, the processing of steps S005A and S005B may be optional. Alternatively, a configuration in which the propagation delay $\tau_{-}(BS{\rightarrow}R)$ is measured and transmitted to the base station 2 without step S005A may be adopted.

In step S101 of FIG. 13, the base station 2 receives the propagation delay $\tau_{-}(UE{\rightarrow}R)$, the processing delay $\tau_{-}(R)$, and the number of antennas $N_{-}(R)$ transmitted from the relay station 3. However, when the propagation delay $\tau_{-}(BS{\rightarrow}R)$ is transmitted in step S005C, the propagation delay $\tau_{-}(BS{\rightarrow}R)$ is also included in reception parameters.

In step S102, the control circuit 22 of the base station 2 determines whether or not the received parameters include the propagation delay $\tau_{-}(BS{\rightarrow}R)$. In this case, when a determination is made that the propagation delay $\tau_{-}(BS{\rightarrow}R)$ is included, the processing proceeds to step S103 and otherwise, the processing proceeds to step S104.

When the processing proceeds to step S103, the control circuit 22 acquires the propagation delay $\tau_{-}(BS{\rightarrow}R)$ from the relay station 3, and the processing proceeds to step S105. When the processing proceeds to step S104, the control circuit 22 measures the propagation delay $\tau_{-}(R{\rightarrow}BS)$ between the relay station 3 and the base station 2 from the reference signal used for notification (transmission) of measured values (the propagation delay $\tau_{-}(UE{\rightarrow}R)$, the processing delay $\tau_{-}(R)$, and the like) from the relay station 3. Thereafter, the processing proceeds to step S105.

In step S105, the control circuit 22 obtains the maximum delay $\Delta_{-}(max)$ from the allowable delay $\tau_{-}(CP)$ on the basis of the measured value notified from the relay station 3. The maximum delay $\Delta_{-}(max)$ is obtained, for example, by using an equation $\Delta_{-}(max)=T_{-}(CP)-(i\ (UE{\rightarrow}R)+T_{-}(R)+T_{-}(R{\rightarrow}BS))+5$. However, when the propagation delay $\tau_{-}(BS{\rightarrow}R)$ is acquired in step S103, $T_{-}(BS{\rightarrow}R)$ is used in place of $T_{-}(R{\rightarrow}BS)$ in the above calculation equation. 5 in the calculation equation is a value given in consideration of the measurement deviation and the delay spread.

In step S106, the control circuit 22 calculates a different delay time $\Delta_{-}(k)$ for each antenna of the relay station 3 so that $\Delta_{-}(k)\ \Delta_{-}(max)$ is satisfied, and transmits the delay time $\Delta_{-}(k)$ to the relay station 3. For the method of calculating the delay time $\Delta_{-}(k)$, the same method as that of the embodiment can be applied.

In step S006A in FIG. 12, the relay station 3 receives the delay time $\Delta_{-}(k)$ for each antenna transmitted from the base station 2 (YES in S006A). Then, the control circuit 32 of relay station 3 sets the weight $w_{-}(k)$ and the delay time $\Delta_{-}(k)$ for the FIR filter 315 (step S007A), and performs the non-regenerative relay (step S008A). Since the processing of steps S007A and S008A is the same as the processing of step S010 (FIG. 10) in the embodiment, description thereof will be omitted.

Thus, in Modification example 1, the control circuit 22 of the base station 2 calculates the delay time $\Delta_{-}(k)$ for each antenna and notifies (transmits) the relay station 3 of the delay time $\Delta_{-}(k)$. The control circuit 32 of the relay station 3 uses the delay time $\Delta_{-}(k)$ calculated by the base station 2 to perform the non-regenerative relay. In step S008 (step S010), the control circuit 32 may determine whether or not a transmission timing of a signal for the terminal station 4 falls within the CP time $(T_{-}(CP))$ at the time of reception in the terminal station 4, and stop the transmission of the signal when the transmission timing does not fall within the CP time $(T_{-}(CP))$. The determination of the stop may be performed by the control circuit 32 of the relay station 3 or may be performed by the control circuit 22 of the base station 2.

Figure 14:
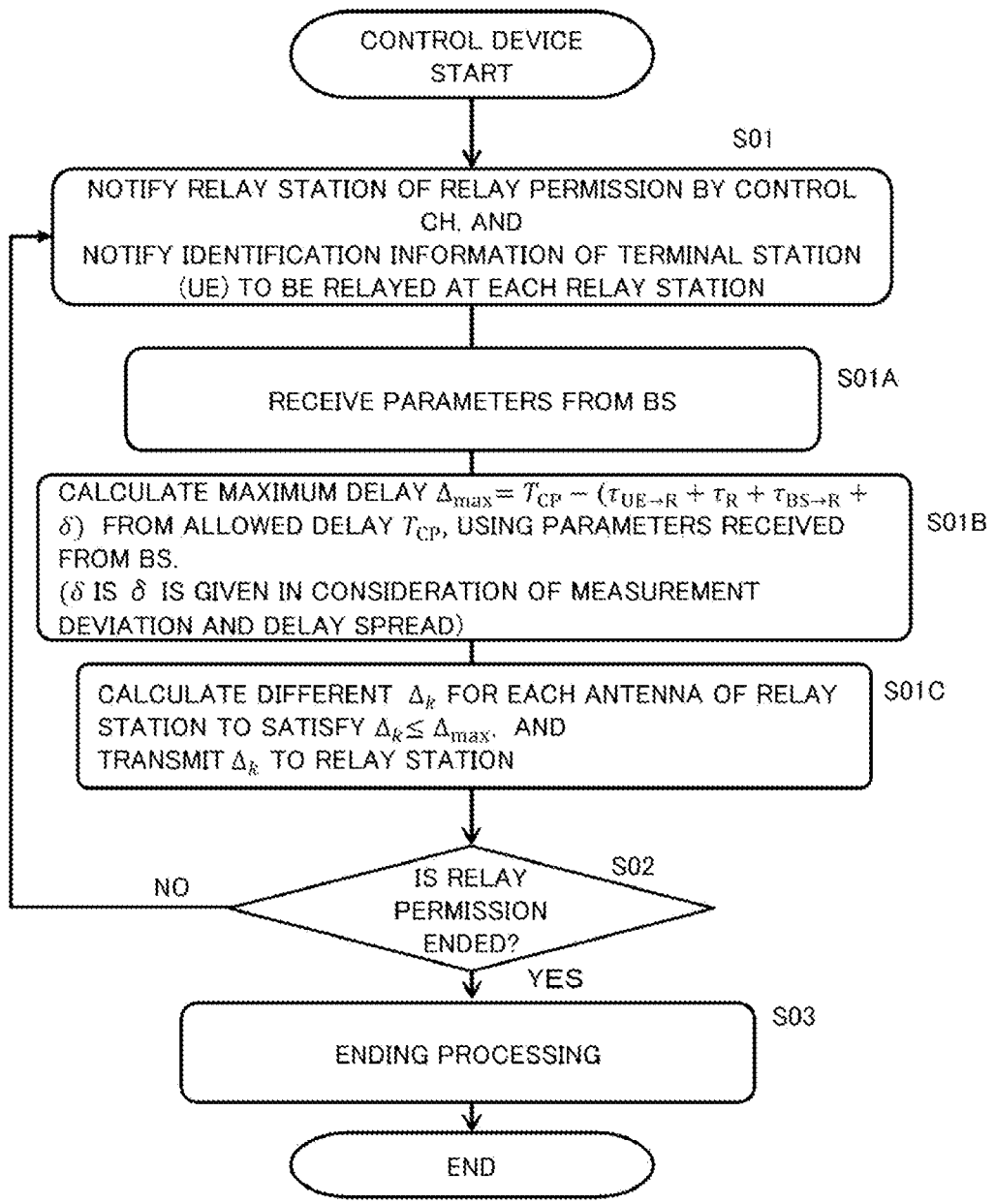
FIG. 14 is a flowchart illustrating an example of processing of a control device in Modification example 2.

FIG. 14 is a flowchart illustrating an example of processing the control device 1 in Modification example 2, and FIG. 15 is a flowchart illustrating an example of processing the base station 2 in Modification example 2. In Modification example 2, the control device 1 calculates the delay time $\Delta_{-}(k)$.

In the processing of Modification example 2 in FIG. 14, steps S01A, S01B, and S01C are provided between steps S01 and S02 in processing (FIG. 8) of the control device 1 in the embodiment.

In step S01A, the control device 1 receives parameters from the base station 2. In step S01B, the control device 1 uses the parameters to calculate $\Delta_{-}(max)$. In step S01C, the control device 1 calculates the delay time $\Delta_{-}(k)$ for each antenna of the relay station 3. Step S01B is the same processing as step S105 in Modification example 1, and step S01C is the same processing as step S016 in Modification example 1.

Since the processing of steps S01, S02, and S03 in FIG. 14 is the same as that of the embodiment, description thereof will be omitted. As in Modification example 2, the calculation of $\Delta_{-}(max)$ and $\Delta_{-}(k)$ can be performed by the control device 1 on the network that receives (obtains) parameters for calculation from the base station 2 in place of the control circuit 22.

In FIG. 15, steps S105A and S106A are provided in place of steps S105 and S106 illustrated in FIG. 13. In step S105, as parameters for calculation of $\Delta_{-}(max)$ and $\Delta_{-}(k)$ of the base station 2, the propagation delay $\tau_{-}(UE{\rightarrow}R)$, the processing delay $\tau_{-}(R)$, the number of antennas $N_{-}(R)$, and the propagation delay $\tau_{-}(R{\rightarrow}BS)$ or the propagation delay $\tau_{-}(BS{\rightarrow}R)$ are transmitted to the control device 1.

In step S106A, the base station 2 receives $\Delta_{-}(k)$ for each antenna from the control device 1 and transmits $\Delta_{-}(k)$ to the relay station 3. Since the processing of steps S101 to S104 in FIG. 15 is the same as that of Modification example 1, description thereof will be omitted. Since an operation of the relay station 3 in Modification example 2 is the same as that in Modification example 1, description thereof will be omitted. As in Modification example 2, the base station 2 may send the parameters for calculation to the control device 1 (step S105A), receive calculation results from the control device 1, and send the calculation results to the relay station 3. As illustrated in Modification example 1 and Modification example 2, the calculation of the delay time $\Delta_{-}(k)$ may be executed by the control circuit 32 (controller) of the relay station 3, may be executed by the control circuit 32 of the base station 2, or may be executed by the control device 1. That is, the relay station 3 may acquire the delay amount (delay time $\Delta_{-}(k)$) calculated in the base station 2 communicating with the relay station 3 or the control device 1 (network) of the relay station 3.

The above embodiments are examples and the disclosure may be implemented with appropriate changes to the extent that the gist is not departed from. The processing and means described in the present disclosure may be freely combined and used as long as technical inconsistency is not generated.

A processing step which was described based on the assumption that one device executes that step may be shared by a plurality of devices. Further, a processing step which was described based on the assumption that difference devices execute that step may be executed by one device. In the computer system, a kind of hardware configuration (server configuration) that implements each function may be freely changed.

The present disclosure may also be implemented by supplying a computer program storing the functions described in the above embodiment to a computer, and one or more processors included in the computer reading and executing the program. This computer program may be provided to the computer by a non-transitory computer-readable storage medium that can be connected to the system bus of the computer, or may be provided to the computer via a network. The non-transitory computer-readable storage medium is an arbitrary type of disk, such as a magnetic disk (e.g. Floppy® disk, hard disk drive (HDD)) and an optical disk (e.g. CD-ROM, DVD disk, Blu-ray disk), a read only memory (ROM), a random access memory (RAM), an EPROM, an EEPROM, a magnetic card, a flash memory, an optical card, and an arbitrary type of medium suitable for storing electronic instructions.

What is claimed is:

1. A relay station capable of executing non-regenerative relay of a first radio signal transmitted from a transmission station to a reception station having one antenna, the relay station comprising:
   a plurality of antennas;
   a plurality of wireless devices corresponding to the plurality of antennas, respectively; and
   a controller configured to control an operation of the plurality of wireless devices, wherein
   each of the plurality of wireless devices includes
   a receiver configured to convert the first radio signal received by a corresponding antenna into a baseband signal;
   a finite impulse response (FIR) filter configured to assign a delay to the baseband signal; and
   a transmitter configured to convert a signal output from the FIR filter into a second radio signal transmitted from the corresponding antenna to the reception station,
   wherein the controller sets a different delay amount in the FIR filter in each of the plurality of wireless devices so that the FIR filter assigns a delay, which is different from among the plurality of antennas, to the baseband signal input from the receiver in each of the plurality of wireless devices.

2. The relay station according to claim 1, wherein the controller uses a first propagation delay serving as a propagation delay in a radio signal propagation path from the reception station to the relay station, a second propagation delay serving as a propagation delay in a radio signal propagation path from the transmission station to the relay station, and a processing delay of a signal in the relay station so as to obtain a maximum delay, and calculates a delay amount to be assigned to each of the plurality of antennas by the respective FIR filters within a range in which the maximum delay is not exceeded.

3. The relay station according to claim 2, wherein the controller calculates the maximum delay in which at least the first propagation delay, the second propagation delay, and the processing delay are reduced from a cyclic prefix time used for communication with the transmission station and with the reception station by the relay station.

4. The relay station according to claim 2, wherein the controller calculates a delay amount to be set in each of the FIR filters included in the plurality of wireless devices so that the delay amount is assigned to the plurality of antennas at equal intervals.

5. The relay station according to claim 2, wherein the relay station randomly calculates the delay amount to be set in each of the FIR filters included in the plurality of wireless devices.

6. The relay station according to claim 1, wherein the controller performs weighting on the FIR filter so that self-interference related to reception of the first radio signal and transmission of the second radio signal is curbed.

7. The relay station according to claim 1, wherein the plurality of antennas receive the first radio signal to which transmission diversity using at least one antenna has been applied by the transmission station.

8. The relay station according to claim 1, wherein the relay station obtains the delay amount calculated in a base station communicating with the relay station or a control device of the relay station.

9. A transmission method for a relay station including a plurality of antennas, the method comprising executing by the relay station:
   receiving, by each of the plurality of antennas, a first radio signal transmitted from a transmission station to a reception station having one antenna;
   converting the first radio signal received by each of the plurality of antennas into a baseband signal corresponding to each of the plurality of antennas;
   assigning a delay, which is different from among the plurality of antennas, to each of the baseband signals corresponding to the plurality of antennas by using a plurality of finite impulse response (FIR) filters; and
   converting each of signals output from the plurality of FIR filters into a second radio signal for the reception station and transmitting the second radio signal from a corresponding antenna.

10. The transmission method of a relay station according to claim 9, wherein the relay station further executes:
    obtaining a maximum delay using a first propagation delay serving as a propagation delay in a radio signal propagation path from the reception station to the relay station, a second propagation delay serving as a propagation delay in a radio signal propagation path from the transmission station to the relay station, and a processing delay of a signal in the relay station; and
    calculating an amount of delay to be assigned to each of the plurality of antennas within a range in which the maximum delay is not exceeded.

11. The transmission method of a relay station according to claim 10, wherein the calculation of the delay amount includes calculating the maximum delay in which at least the first propagation delay, the second propagation delay, and the processing delay are reduced from a cyclic prefix time used for communication with the transmission station and with the reception station by the relay station.

12. The transmission method of a relay station according to claim 10, wherein the calculation of the delay amount includes calculating, by the relay station, the delay amount to be set in each of the FIR filters included in the plurality of wireless devices so that the maximum delay is divided at equal intervals.

13. The transmission method of a relay station according to claim 10, wherein the calculation of the delay amount includes randomly calculating, by the relay station, the delay amount to be set in each of the FIR filters included in the plurality of wireless devices.

14. The transmission method for a relay station according to claim 9, wherein the relay station further performs weighting on the FIR filter so that self-interference related to reception of the first radio signal and transmission of the second radio signal is curbed.

15. The transmission method of a relay station according to claim 9, wherein the reception of the first radio signal includes receiving the first radio signal to which transmission diversity using at least one antenna has been applied by the transmission station.

16. The transmitting method of a relay station according to claim 9, wherein the relay station assigns the delay, which is different from among the plurality of antennas, based on relay amount calculated in a base station communicating with the relay station or a control device of the relay station.

17. A communication system comprising:
   a transmission station;
   a reception station with one antenna; and
   at least one relay station capable of executing non-regenerative relay for a first radio signal transmitted from the transmission station to the reception station, wherein
   the relay station includes
   a plurality of antennas,
   a plurality of wireless devices corresponding to the plurality of antennas, respectively; and
   a controller configured to control an operation of the plurality of wireless devices,
   each of the plurality of wireless devices includes
   a receiver configured to convert the first radio signal received by the corresponding antenna into a baseband signal,
   a finite impulse response (FIR) filter configured to assign a delay to the baseband signal, and
   a transmitter configured to convert a signal output from the FIR filter into a second radio signal transmitted from the corresponding antenna to the reception station, and
   the controller sets a different delay amount in the FIR filter in each of the plurality of wireless devices so that the FIR filter assigns a delay, which is different from among the plurality of antennas, to the baseband signal input from the receiver in each of the plurality of wireless devices.

18. The communication system according to claim 17, wherein the controller uses a first propagation delay serving as a propagation delay in a radio signal propagation path from the reception station to the relay station, a second propagation delay serving as a propagation delay in a radio signal propagation path from the transmission station to the relay station, and a processing delay of a signal in the relay station so as to obtain a maximum delay, and calculates a delay amount to be assigned to each of the plurality of antennas by the respective FIR filters within a range in which the maximum delay is not exceeded.

19. The communication system according to claim 17, wherein
   the transmission station is a base station configured to transmit an instruction to the relay station, and
   the relay station performs assignment of a delay using the FIR filter according to the instruction received from the base station.

20. The communication system according to claim 19, wherein the instruction includes the delay amount calculated in a base station communicating with the relay station or a control device of the relay station.

* * * * *